(12) United States Patent
Bellinger et al.

(10) Patent No.: US 6,380,310 B2
(45) Date of Patent: *Apr. 30, 2002

(54) NYLON COMPOSITIONS FOR GOLF BALL COVERS AND METHOD OF MAKING SAME

(76) Inventors: Michelle A. Bellinger, 7 High Wood Rd., W. Hartford, CT (US) 06117; Michael J. Sullivan, 58 Marlborough St., Chicopee, MA (US) 01020

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/241,186

(22) Filed: Feb. 1, 1999

Related U.S. Application Data

(62) Division of application No. 08/763,070, filed on Dec. 10, 1996, now Pat. No. 5,886,103.

(51) Int. Cl.⁷ .............. A63B 37/12; C08L 77/00
(52) U.S. Cl. .............. 525/179; 525/183; 473/378; 473/385
(58) Field of Search .............. 525/63, 69, 179, 525/183; 473/378, 385

(56) References Cited

U.S. PATENT DOCUMENTS

| | | | |
|---|---|---|---|
| 4,078,014 A | * 3/1978 | Starkweather | |
| 4,234,184 A | 11/1980 | Deleens et al. | 273/235 |
| 4,858,924 A | 8/1989 | Saito et al. | 273/62 |
| 4,919,434 A | 4/1990 | Saito | 273/235 |
| 4,968,038 A | 11/1990 | Yamada | 273/232 |
| 5,210,138 A | * 5/1993 | Yamamoto | |
| 5,215,308 A | 6/1993 | Hiraoka et al. | 273/218 |
| 5,348,804 A | 9/1994 | Vasselin et al. | 428/423.1 |
| 5,427,377 A | 6/1995 | Maruoka | 273/230 |
| 5,569,712 A | * 10/1996 | Wang | |
| 5,730,663 A | * 3/1998 | Tanaka | |
| 5,733,207 A | * 3/1998 | Sullivan | |
| 5,886,103 A | * 3/1999 | Bellinger | |

FOREIGN PATENT DOCUMENTS

| | | | |
|---|---|---|---|
| EP | 0148632 A2 | 7/1985 | C08F/8/44 |
| EP | 0115190 B1 | 9/1987 | C08F/8/44 |
| GB | 2299999 | 10/1996 | |
| JP | 155053 | * 6/1996 | |

OTHER PUBLICATIONS

Derwent Abstract of J6192512, J6299052, J60060867, J61113475, J63009461.

Derwent Abstract of J2140253, J62022841, J62144673, DE3544766, DE3535733, J61206469, J61196980, J61191370, J61113475, J60210272, J60145158, EP148632, J59157122, EP115190, GB2107198.

Derwent Abstract of DE3134554, J57078876, DE2944640, WO9106346.

* cited by examiner

*Primary Examiner*—David J. Buttner

(57) ABSTRACT

Disclosed herein is a golf ball with a cover formed from a polyamide composition and a method of making the same. More specifically, the golf ball has a cover which contains a combination of a polyamide component and an ionomeric component or a non-ionomeric terpolymer component. The cover composition has excellent durability and resistance to cracking, even at cold temperatures. The nylon-ionomer blend is a useful substitute for an ionomer golf ball cover, particularly when a low spin golf ball is desired.

33 Claims, 1 Drawing Sheet

NYLON COMPOSITIONS FOR GOLF BALL COVERS AND METHOD OF MAKING SAME

This is a divisional of U.S. application Ser. No. 08/763,070 filed on Dec. 10, 1996 which is now U.S. Pat. No. 5,886,103.

FIELD OF THE INVENTION

The present invention relates to compositions suitable for golf ball constructions, and to golf balls which employ those compositions.

BACKGROUND OF THE INVENTION

Modern golf balls typically employ ionomeric resins as cover materials. Ionomeric resins, as a result of their toughness, durability, and wide range of hardness values have become materials of choice for golf ball covers over traditional rubbers. Ionomeric resins generally comprise an α-olefin and an α, β ethylenically unsaturated mono- or dicarboxylic acid neutralized with metal ions to the extent desired. Olefins which have been employed to prepare ionomeric resins include ethylene, propylene, butene-i and the like. Unsaturated carboxylic acids which have been employed to prepare ionomeric resins include acrylic, methacrylic, ethacrylic, o-chloroacrylic, crotonic, maleic, fumaric, itaconic and the like. Ionomeric resins include copolymers of ethylene with acrylic acid such as those sold by Exxon Corporation under the trademark "IOTEK", as well as copolymers of ethylene with methacrylic acid such as those sold by E.I. DuPont Nemours & Company under the trademark "SURLYN". In some instances, a softening comonomer such as an acrylate ester has been included such that the ionomeric copolymer is an ionomeric terpolymer. Although various compositions have been employed to provide golf balls of varying playability characteristics, a need continues for compositions and covers which can be employed to provide golf balls which exhibit good playability and durability.

There are no commercially available golf balls which are generally known to contain nylon. Nylon alone would be too brittle for use in a golf ball cover. When efforts have been made in other fields to blend nylon with softer materials some degree of incompatibility often has resulted, rendering the blends susceptible to cracking and premature failure. U.S. Pat. No. 4,690,981, the contents of which are incorporated herein by reference, shows soft terpolymer ionomers of ethylene/unsaturated carboxylic acid/softening comonomer which are useful in injection-molded items such as ski boots, ice skate shells, as coatings for fabrics, and as a replacement for balata in golf balls. The unsaturated carboxylic acid may be, for example, acrylic acid and methacrylic acid. The softening comonomer is, for example, an alkyl acrylate such as n-butyl acrylate. The '981 patent briefly mentions that the ionomers can be blended with other materials such as nylon, polypropylene, propylene-ethylene copolymers, linear polyethylene, and ethylene/unsaturated carboxylic acid copolymers. However, there is no indication that blends can be used for golf balls.

SUMMARY OF THE INVENTION

An object of the invention is to provide a highly durable golf ball.

Another object of the invention is to provide a golf ball with a cover layer containing reduced quantities of ionomer.

A further object of the invention is to provide a golf ball having a high coefficient of restitution.

Another object of the invention is to provide a durable golf ball with a low spin rate.

Yet another object of the invention is to provide a golf ball having a hard cover layer which is resistant to cracking.

Another object of the invention is to provide a method of making a golf ball with a cover layer of the type described above.

Other objects of the invention will be in part obvious and in part pointed out more in detail hereinafter.

The invention in a preferred form is a golf ball having a cover layer with a resin composition comprising a combination of a polyamide component and an ionomeric component, the content of the polyamide component being at least 23 wt % of the resin composition, the golf ball having a coefficient of restitution of at least 0.750. The polyamide component preferably includes at least one member selected from the group consisting of a polyamide homopolymer and a polyamide copolymer. In one preferred form of the invention, at least a portion of the polyamide component and at least a portion of the ionomeric component are part of the same copolymer. In another form of the invention, the polyamide component is present in a mixture with the ionomeric component. The combination preferably has 23–85 wt % polyamide component and at least 15–77 wt % ionomeric component.

In one particularly preferred form of the invention, the combination further includes an ester component. The ester component can be, for example, an olefin ester component. At least a portion of each of the polyamide component, ionomeric component and ester component preferably are part of the same copolymer. The composition of this embodiment optionally further comprises a carboxylic acid-containing copolymer which includes at least one member selected from the group consisting of ionomeric copolymers and non-ionomeric terpolymers and which is mixed with the copolymer of polyamide, ionomer and ester components.

In another particularly preferred form of the invention, the ionomeric component includes an acrylate ester. The polyamide component preferably is in a mixture with the ionomeric component. In yet another embodiment of the invention, the combination of a polyamide component and ionomeric component is mixed with a non-polyamide-containing copolymer.

Some examples of the invention include a graft copolymer or blend of a polyamide homopolymer with one or both of an ionomeric terpolymer and an ionomeric copolymer with two types of monomers. Preferred polyamides for use according to the invention are polymers of caprolactam such as polyepsiloncaprolactam (nylon 6), polyhexamethyleneadipamide (nylon 66), and copolymers of nylon 6 and nylon 66. The ionomeric component of the invention preferably is a copolymer formed from an α-olefin having 2 to 8 carbon atoms and an acid which is selected from the group consisting of α, β-ethylenically unsaturated mono- or dicarboxylic acids and is neutralized with cations which include at least one member selected from the group consisting of zinc, lithium, sodium, manganese, calcium, chromium, nickel, aluminum, potassium, barium, tin, copper, and magnesium ions. Preferred cations are zinc, sodium and lithium, and combinations thereof. In one preferred embodiment, the copolymer is further formed from an unsaturated monomer of the acrylate ester class having from 1 to 21 carbon atoms. The golf ball preferably has a Durability Rating of at least 2.

Another preferred form of the invention is a golf ball having a cover layer with a composition comprising a graft copolymer of (1) at least one of a polyamide homopolymer and a polyamide copolymer and (2) a first ionomeric copolymer which is formed from an α-olefin and a carboxylic acid. The golf ball has a Durability Rating of at least 2. The cover layer has a Shore D hardness of at least 30.

Yet another preferred form of the invention is a golf ball having a cover layer with a composition comprising a nylon backbone with ionomer grafted thereto, the golf ball having a coefficient of restitution of at least 0.750.

Another preferred form of the invention is a golf ball having a cover layer with a composition comprising a combination of a polyamide and a non-ionomeric acid copolymer which is formed from an α-olefin, an ester, and a carboxylic acid. The golf ball preferably has a Durability Rating of at least 2.

A further preferred form of the invention is a golf ball having a cover layer comprising at least 10 wt % of a graft copolymer of polyepsiloncaprolactam and ionomer, the graft copolymer having a yield tensile strength of about 54 MPa (ASTM D-638), a flexural modulus of about 1585 MPa (ASTM D-790), and a drop weight impact at −40° F. of about 200 J (ASTM D-3029). In a particularly preferred form of the invention, the cover layer comprises at least 80 wt % of the graft copolymer.

Yet another preferred form of the invention is a method of making a golf ball. The method comprises steps of obtaining a golf ball core, and forming a cover layer over the core, the cover layer having a resin composition comprising a combination of a polyamide component and an ionomeric component, the content of the polyamide component being at least 23 wt % of the resin composition, the golf ball having a coefficient of restitution of at least 0.750.

The invention comprises the several steps in the relation of one or more such steps with respect to each of the others, and the article possessing the features, properties and the relation of elements exemplified in the following detailed disclosure.

DETAILED DESCRIPTION OF THE INVENTION

Figure 2:
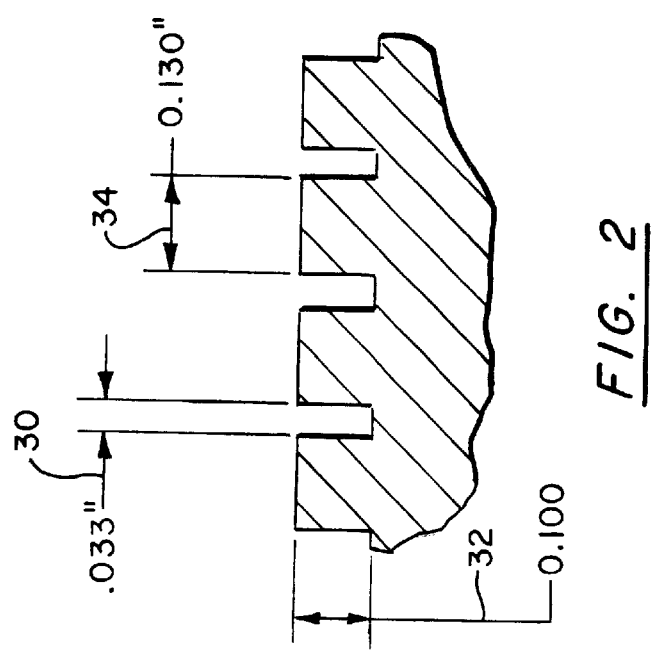
FIG. 2 is a partial side view of a portion of an insert plate in the durability test apparatus which has grooves intended to simulate a golf club face.

The present invention relates to golf balls which employ polyamide containing constructions, preferably as inner and/or outer cover compositions of golf balls having a core and one, two, or more cover layers formed thereon. Some non-limiting examples of compositions according to the invention are as follows:

(1) the reaction product ("RP") of a 3-part reactive mixture of polyamide, ionomeric copolymer, and ester,
(2) RP and at least one non-ionomeric terpolymer,
(3) RP with at least one ionomeric copolymer,
(4) a polyamide homopolymer and/or copolymer combined with at least one ionomeric copolymer, and
(5) a polyamide homopolymer and/or copolymer combined with at least one non-ionomeric carboxylic acid-containing terpolymer.

The low spin golf balls of the invention preferably have a coefficient of restitution of at least 0.780 and more preferably at least 0.800. The Shore D hardness of a hard nylon-containing cover layer generally is at least 65 (measured generally in accordance with ASTM D-2240, but measured on the curved surface of the ball). The PGA compression of the hard cover layer generally is 85–117, more preferably 90–105, and most preferably 90–97. The high spin, softer golf balls of the invention preferably have a COR of at least 0.775 and more preferably at least 0.790, a Shore D hardness of 30–60, and a PGA compression of 70–100, more preferably 75–95 and most preferably 75–85. Both hard and soft nylon-containing covers preferably have a melt index of 0.5–20 g/10 min., more preferably 0.5–8 g/10 min., and most preferably 1–4 g/10 mins.

An "ionomeric copolymer" as this term is used herein is a copolymer of an α-olefin and an α, β-ethylenically unsaturated mono- or dicarboxylic acid with at least 3% of the carboxylic acid groups being neutralized with metal ions. The α-olefin preferably has 2–8 carbon atoms, the carboxylic acid preferably is acrylic acid, methacrylic acid, maleic acid, or the like and the metal ions include at least one cation selected from the group consisting of ions of zinc, magnesium, lithium, barium, potassium, calcium, manganese, nickel, chromium, tin, aluminum, sodium, copper, or the like. Preferably the cation is zinc, sodium or lithium or a combination thereof. The term "copolymer" includes (1) copolymers having two types of monomers which are polymerized together, (2) terpolymers (which are formed by the polymerization of three types of monomers), and (3) copolymers which are formed by the polymerization of more than three types of monomers.

A "polyamide component" as used herein is a polyamide homopolymer, a polyamide copolymer containing two or more types of amide units, e.g. nylon 6, 12, or a combination of both a polyamide homopolymer and a polyamide copolymer. The polyamide component preferably is a long chain polymer, not an oligomer, which typically is a short chain polymer of 2–10 units. An "ionomeric component" is (a) a non-polyamide-containing ionomeric copolymer which is capable of being mixed or blended with the polyamide component, (b) the ionomeric portion of a polyamide-containing ionomeric copolymer, or a combination of both (a) and (b). If the polyamide component and ionomeric component are bonded to one another, the acid portion of the ionomeric component preferably is neutralized before the reaction of the polyamide and ionomeric components, but most probably could also be neutralized after the reaction of the polyamide and ionomeric components.

The details of interaction between a polyamide and an ionomeric copolymer are not fully understood. A polyamide and an ionomer could, for example, be intimately mixed without any bonding but with specific intermolecular interactions. Furthermore, it is possible, in combining a specific quantity of polyamide with a specific quantity of ionomeric copolymer that portions of the overall quantities of the polyamide component and ionomeric component could be bonded to each other, as in a graft reaction, while other portions of the polyamide component and ionomeric component could form a blend which may have specific intermolecular interactions. Thus, this application is not intended to be limited by the degree of bonding versus intermolecular interaction of the polyamide component and ionomeric component unless specifically indicated.

In a first embodiment, golf balls of the invention employ, preferably as a cover, a composition that is the reaction product ("RP") of a reactive mixture of polyamide, ionomeric copolymer, and an ester. The RP preferably is formed from a reactive mixture of at least one of polyepsiloncaprolactam (Nylon 6) and polyhexamethyleneadipamide (Nylon 66), zinc neutralized ethylene/methacrylic acid ionomer copolymer, and ethylene (meth)acrylate. As used herein, the term "(meth)acrylate" includes both acrylates and methacrylates. The polyamide preferably is about 50 wt % to about 90 wt % of the reactive mixture, the ionic copolymer is about 5–50 wt % of the reactive mixture, and the copolymer is about 1–20 wt % of the reactive mixture. More preferably, the polyamide is about 60–72 wt % of the reactive mixture, the ionic copolymer is about 26–34 wt % of the reactive mixture, and the ester copolymer, preferably olefin ester copolymer, is about 2–6 wt % of the reactive mixture.

Commercially available products which are the reaction products of reactive mixtures of polyamide, ionic copolymer, and olefin ester copolymer include CAPRON 8351, available from Allied Signal. This reactive mixture, and the processing thereof, is believed to be described in U.S. Pat. No. 4,404,325, the teachings of which are incorporated herein by reference in their entirety. As described therein, the preferred polyamide is polyepsiloncaprolactam or polyhexamethyleneadipamide, most preferably polyespiloncaprolactam. The preferred olefin ester copolymer is ethylene/ethyl acrylate. The preferred ionic copolymer is a Zn neutralized copolymer of ethylene/methacrylic acid available from DuPont under the trade name SURLYN 9721 (1801). According to claim 7 of U.S. Pat. No. 4,404,325, the polyamide is present in the reactive mixture in an amount of about 60–72 wt %, the ionomeric copolymer is present in an amount of about 26 wt % to about 34 wt %, and the olefin ester copolymer is present in an amount of about 2 to about 6 wt %, based on the total weight of the reactive mixture. It is believed that CAPRON 8351 has a nylon backbone with ionomer grafted thereto. Allied Signal states that CAPRON 8351 is a graft copolymer which has the properties shown in Table 1 below.

TABLE 1

| Property | Test Method (ASTM) | Value |
|---|---|---|
| Specific Gravity | D-792 | 1.07 |
| Yield Tensile Strength, psi (MPa) | D-638 | 7800 (54) |
| Ultimate Elongation % | D-638 | 200 |
| Flexural Strength, psi (MPa) | D-790 | 9500 (65) |
| Flexural Modulus, psi (MPa) | D-790 | 230,000 (1585) |
| Notched Izod Impact ft-lbs/in | D-256 | No break |
| Drop weight Impact ft-lbs (J) | D-3029 | 150 (200) |
| Drop weight Impact @ −40F., ft-lbs (J) | D-3029 | 150 (200) |
| Heat Deflection temp. @ 264 psi, ° C. | D-648 | 60 |
| Melting Point, ° C. | D-789 | 215 |

CAPRON 8351 is the most preferred RP for use in the invention. Variations of CAPRON 8351 also may be used. For example, variations of CAPRON 8351 which may be used include those which employ polyepsiloncaprolactam or polyhexamethyleneadipamide with olefin ester copolymers such as ethylene/methyl acrylate, ethylene/ethyl methacrylate, and ethylene/methyl methacrylate. Ionic copolymers which may be used in variations of CAPRON 8351 include ionic copolymers of an alpha olefin of the formula $RCH=CH_2$ where R is H or alkyl radicals having 1–8 carbons, and an $\alpha$, $\beta$ ethylenically unsaturated carboxylic acid having from 3–8 carbons. The ionic copolymer has at least about 10 wt % of the COOH groups neutralized with metal cations, preferably Zn. Examples of these ionic copolymers include Zn neutralized ethylene/methacrylic acid. In variations of CAPRON 8351, the reactive mixture neutralized to produce such variations may include about 50 wt % to about 90 wt % polyamide, about 5 wt % to 50 wt % ionic copolymer, and about 1 wt % to 20 wt % olefin ester copolymer, all percents based on the weight of the reactive mixture.

In another embodiment, golf balls of the invention employ preferably as a cover, a composition that includes RP and at least one terpolymer. Terpolymers which may be employed include olefin/alkyl (meth)acrylate/carboxylic acid terpolymers. These terpolymers typically have about 50–98 wt % olefin, about 1–30 wt % alkyl acrylate, and about 1–20 wt % carboxylic acid. The olefin may be any of ethylene, propylene, butene-1, hexene-1 and the like, preferably ethylene. The alkyl (meth)acrylate may be any of methyl acrylate, methyl methacrylate, ethyl acrylate, ethyl methacrylate, butyl acrylate, butyl methacrylate, butyl vinyl ether, methyl vinyl ether, and the like, preferably methyl acrylate. The carboxylic acid may be any one of acrylic acid, methacrylic acid, maleic acid, and fumaric acid. Monoesters of diacids such as methyl hydrogen maleate, methyl hydrogen furmarate, ethyl hydrogen fumarate, and maleic anhydride which is considered to be a carboxylic acid may also be used. Preferably, the carboxylic acid is acrylic acid. Useful ethylene/methyl acrylate/acrylic acid terpolymers may comprise about 98–50 wt %, preferably about 65–85 wt %, most preferably about 76 wt % ethylene, about 1–30 wt % preferably 15–20 wt %, most preferably about 18 wt % methyl acrylate, and about 1–20 wt %, preferably about 4–10 wt %, most preferably about 6 wt % acrylic acid.

Olefin/alkyl (meth)acrylate/carboxylic acid terpolymers which are preferred for use in the compositions employed in the invention are ethylene/methyl acrylate/acrylic acid terpolymers such as those marketed by Exxon Chemical Co. under the name ESCOR. Examples of these terpolymers include ESCOR ATX 320 and ESCOR ATX 325. The properties of ESCOR ATX 320 and ESCOR ATX 325 as provided by Exxon are presented in Table 2.

TABLE 2

| Property/Resin | ESCOR ATX-320 | ESCOR ATX-325 |
|---|---|---|
| Melt Index[1] | 5.0 g/10 min | 20.0 g/10 min |
| Density[1] | 0.950 g/cc | 0.950 g/cc |
| Melting Point[1] | 69 C. | 67 C. |
| Crystallization Temperature[1] | 51 C. | 50 C. |
| Vicat Softening Temperature 200 g[2] | 66 C. | 60 C. |
| Tensile Strength @ yield[3] | 12 MPa | 7.8 MPa |
| Hardness[4] | 34 | 30 |
| Elongation @ break[3] | >800% | >800% |

[1]Exxon Method
[2]ASTM D 1525
[3]ASTM 638
[4]Shore D

Other olefin/alkyl (meth)acrylate/carboxylic acid terpolymers which may be employed with RP in the compositions employed in the invention include but are not limited to:

ethylene/n-butyl acrylatelacrylic acid,
ethylene/n-butyl acrylate/methacrylic acid,
ethylene/2-ethoxyethyl acrylate/acrylic acid,
ethylene/2-ethoxyethyl acylate/methacrylic acid,
ethylene/n-pentyl acrylate/acrylic acid,
ethylene/n-pentyl acrylate/methacrylic acid,
ethylene/n-octyl acrylate/acrylic acid,
ethylene/2-ethyhexyl acrylate/acrylic acid,
ethylene/n-propyl acrylate/acrylic acid,
ethylene/n-propyl acrylate/methacrylic acid, ethylene/n-heptyl acrylate/acrylic acid,
ethylene/2-methoxyethyl acrylate/acrylic acid,
ethylene/3-methoxypropyl acrylate/acrylic acid,
ethylene/3-ethoxypropyl acrylate/acrylic acid, and
ethylene/acrylate/acylic acid.

Compositions which may be employed to provide golf balls according to this embodiment of the invention include about 1 to about 90 wt %, preferably about 1 to about 30 wt %, most preferably about 15 wt % RP and about 99 wt % to about 10 wt % terpolymer, preferably about 99 wt % to about 70 wt %, most preferably about 85 wt % terpolymer.

In another embodiment, golf balls of the invention employ, preferably as a cover, compositions which include RP and an olefin/alkyl acrylate/carboxylic acid terpolymer ionomer. Typically, the carboxylic acid groups of the terpolymer ionomer are partially (i.e., approximately 5–80 percent) neutralized by metal ions such as Li, Na, Zn, Mn, Ni, Ba, Sn, Ca, Mg, Cu and the like, preferably Zn, Na or Li or a combination thereof, most preferably Zn or Li or a combination thereof. These terpolymer ionomers usually have a relatively high molecular weight, e.g., a melt index of about 0.1 to 1000 g/10 min., and/or a weight average molecular weight of 5000 up to one million. The ethylene/methyl acrylate/acrylic acid terpolymer ionomer may comprise about 50–98 wt %, preferably about 76–75 wt %, most preferably about 76 wt % ethylene, about 1–30 wt %, preferably about 15–20 wt %, most preferably about 18 wt % methyl acrylate, and about 1–20 wt %, preferably about 4–10 wt %, most preferably about 6 wt % acrylic acid. Useful terpolymer ionomers include, for example, ethylene/methyl acrylate/acrylic acid terpolymer ionomers sold by Exxon Chemical Co. under the designation "IOTEK". Preferred terpolymer ionomers for use in the invention include Zn neutralized ethylene/methyl acrylate/acrylic acid terpolymer ionomers such as IOTEK 7520 and IOTEK 7510, and Li neutralized ionomers such as ESCOR ATX-320-Li-80.

ESCOR ATX 320 Li-80 is produced by utilizing a 6.0 wt % acrylic acid/18.0 wt % methyl acrylate/76 wt % ethylene terpolymer produced by Exxon Chemical Co. under the designation ESCOR ATX 320. The acid groups present in the terpolymer then are neutralized to 80 mol % by Li using lithium hydroxymonohydrate. Neutralization is performed by adding lithium hydroxymonohydrate and ESCOR ATX 320 terpolymer to an intensive mixer (Banbury® type). The Li salt solubilizes in the ATX 320 terpolymer above the melting temperature of the terpolymer, and a vigorous reaction occurs with foaming as the Li cation reacts with the acid groups of the terpolymer, and volatile byproducts are evaporated. The reaction is continued until foaming ceases (i.e., about 30–45 minutes at 250–350 F.) and the batch is removed from the Banbury mixer. Mixing continues on a hot two-roll mill (175 F.–250 F.) to complete the neutralization reaction.

For the purpose of determining the weight percent of neutralization of the acrylic acid groups in the terpolymer ionomer after reacting with the Li salt, it is assumed that one mol of Li neutralizes one mol of acrylic acid. The calculations of neutralization are based upon an acrylic acid molecular weight of 72 g/mol, giving 0.067 mols of Li per 100 grams of the terpolymer.

Although ESCOR ATX 320 terpolymer can be 80 mol % neutralized by Li, it is to be understood that other degrees of neutralization with Li, ranging from about 3 mol % to about 90 mol %, may be employed to provide useful ionomers. Thus, for example, ATX 320 that is 20 mol % neutralized by Li, hereinafter referred to as ATX 320-Li-20 may be employed. In addition, various cation salts such as salts of Na, K, Mg, Mn, Ca and Ni may be employed in a manner similar to Li salts to provide various other ESCOR ATX 320 type terpolymer ionomers.

Other terpolymer ionomers which may be used in the compositions employed in this embodiment of the invention include ethylene/alkyl ester/methacrylic acid terpolymer ionomers such as those disclosed in U.S. Pat. No. 4,690,981, the teachings of which are incorporated by reference in its entirety herein, and which are available from DuPont Corp. under the trade name SURLYN. Properties of five SURLYN terpolymer ionomers which may be used in the invention are set forth in Table 3. The terpolymer ionomer may be about 1 wt % to about 99 wt %, preferably about 50 wt % to about 99 wt %, most preferably about 85 wt %, all amounts based on the total weight of the RP-terpolymer ionomer composition. RP may be about 1 wt % to about 99 wt %, preferably about 1 wt % to about 50 wt %, most preferably about 15 wt %, all amounts based on the total weight of the composition.

TABLE 3

| Resin/Property | ASTM | Surlyn 7930 | Surlyn 7940 | Surlyn 8020[1] | Surlyn 8528 | Surlyn 8550 | Surlyn 8660 | Surlyn 8120[1] | Surlyn 8320[1] | Surlyn 9020[1] |
|---|---|---|---|---|---|---|---|---|---|---|
| Cation | | Li | Li | Na | Na | Na | Na | Na | Na | Zn |
| Melt Flow Index (g/10 min) | D-1238 | 1.8 | 2.6 | 1 | 1.3 | 3.9 | 10 | 0.9 | 0.9 | 1.1 |
| Density | D-792 | 0.94 | 0.94 | 0.95 | 0.94 | 0.94 | 0.94 | 0.94 | 0.94 | 0.96 |
| Notched Izod | D-256 | NB[1] | NB[1] | NB[1] | 11.4 | — | 16 | — | — | NB[2] |
| Tensile Impact (23 C.) ft-lb/in$^2$ | D-1822S | 140 | 220 | 630 | 550 | 795 | 345 | 235 | 213 | 610 |
| Flexural Mod (23 C.) kpsi | D-790 | 67 | 61 | 14 | 32 | 31.7 | 34 | 49.1 | 19.3 | 14 |
| Yield Strength (kpsi) | D-638 | 2.8 | 2.2 | — | 1.8 | 1.6 | 1.9 | 2.2 | 2.3 | — |
| Elongation (%) | D-638 | 290 | 285 | 530 | 450 | 419 | 470 | 680 | 770 | 510 |
| Hardness, Shore D | D-2240 | 68 | 68 | 56 | 60 | 60 | 62 | 38 | 25 | 55 |
| Vicat Temp. (C.) | D-1525-70 Rate B | 62 | 63 | 61 | 73 | 78 | 71 | 51 | 48 | 57 |

TABLE 3-continued

| Resin/Property | ASTM | Surlyn 9320[1] | Surlyn 9520 | Surlyn 9650 | Surlyn 9720 | Surlyn 9730 | Surlyn 9910 | Surlyn 9950 | Surlyn 9970 |
|---|---|---|---|---|---|---|---|---|---|
| Cation | | Zn | Zn | Zn | Zn | Zn | Zn | Zn | Zn |
| Melt Flow Index (g/10 min) | D-1238 | 0.6 | 1.1 | 5 | 1 | 1.6 | 0.7 | 5.5 | 1.4 |
| Density | D-792 | 0.94 | 0.95 | 0.96 | 0.96 | 0.95 | 0.97 | 0.96 | 0.95 |
| Notched Izod | D-256 | | 10.1 | 14.5 | NB[1] | NB[1] | 6.8 | NB[1] | NB[1] |
| Tensile Impact (23 C.) ft-lb/in$^2$ | D-1822S | | 570 | 460 | 600 | 590 | 485 | 485 | 360 |
| Flexural Mod (23 C.) kpsi | D-790 | 3.7 | 38 | 32 | 36 | 30 | 48 | 37 | 28 |
| Yield Strength (kpsi) | D-638 | 3.5 | 1.8 | 1.8 | 1.7 | 1.6 | 2 | 1.8 | 1.6 |
| Elongation (%) | D-638 | 500 | 410 | 410 | 440 | 460 | 290 | 490 | 460 |
| Hardness, Shore D | D-2240 | 40 | 60 | 63 | 61 | 63 | 64 | 62 | 62 |
| Vicat Temp. (C.) | D-1525-70 Rate B | 454 | 74 | 71 | 71 | 73 | 62 | 66 | 61 |

[1]Terpolymer ionomers
[2]No Break

In another embodiment, golf balls of the invention employ, preferably as a cover, compositions of olefin/carboxylic acid copolymer ionomers made from two types of monomers and RP. Olefin/carboxylic acid copolymer ionomers which may be employed with RP include those wherein the carboxylic acid groups of the copolymer ionomer are partially (i.e., approximately 5–80 percent) neutralized by metal ions such as but not limited to Li, Na, Zn and Mg, preferably Zn, Na. Ionic copolymers may be zinc neutralized ethylene/methacrylic acid ionomer copolymer, Na neutralized ethylene/acrylic acid copolymer ionomers, and mixtures thereof. The Zn neutralized ethylene/acrylic acid copolymer ionomer can be the reaction product of Zn neutralization of an ethylene/acrylic acid copolymer having about 15–20 wt % acrylic acid and a melt index of about 37 to about 100. These copolymer ionomers usually have a relatively high molecular weight, e.g., a melt index of about 0.1 to 1000 g/10 min., and/or a weight average molecular weight of 5000 up to one million. Useful copolymer ionomers include, for example, ethylene/acrylic acid copolymer ionomers sold by Exxon Chemical Co. under the designation "IOTEK" such as IOTEK 7030, IOTEK 7020, IOTEK 7010, IOTEK 8030, IOTEK 8020, and IOTEK 8000. Non-limiting examples of preferred IOTEK copolymer ionomers for use in the invention include IOTEK 7010, IOTEK 7030 and IOTEK 8000. Properties of various IOTEK copolymer ionomers are shown in Tables 4–5.

TABLE 4

| Resin/Property | ASTM Method | IOTEK 4000 | IOTEK 4010 | IOTEK 7010 | IOTEK 7020 | IOTEK 7030 | IOTEK 8000 | IOTEK 8020 | IOTEK 8030 | IOTEK* 7520 | IOTEK* 7510 | IOTEK 3110 |
|---|---|---|---|---|---|---|---|---|---|---|---|---|
| Cation | | Zn | Zn | Zn | Zn | Zn | Na | Na | Na | Zn | Zn | Na |
| Melt Flow Index g/10 min | D-1238 | 2.5 | 1.5 | 0.8 | 1.5 | 2.5 | 0.8 | 1.6 | 2.8 | 2 | 0.8 | 1.3 |
| Density kg/m$^3$ | D-792 | 964 | 966 | 968 | 966 | 964 | 957 | 0.956 | 956 | 962 | 970 | 939 |
| Melting Point, C. | D-2240 | 85 | 84 | 83.5 | 84 | 85 | 83 | 84 | 87 | 67 | 67 | 95 |
| Crystallization Point, C. | D-638 | 58 | 56 | 55 | 56 | 58 | 45 | 47 | 49 | 39 | 38 | 58 |
| Vicat Softening Point, C. | D-638 | 60 | 60 | 60 | 60 | 60 | 54 | 54.5 | 55.5 | 40 | 40 | 75 |
| Flexural Mod, MPa | D-790 | 155 | 175 | 190 | 175 | 155 | 320 | 340 | 355 | 30 | 35 | 260 |
| Tensile Impact at 23 C., KJ/m$^2$ (Type S Dumbbell, 2 mm Thick Compression Plaques) | D-1822 | 480 | 520 | 550 | 520 | 480 | 570 | 550 | 500 | 780 | 950 | 580 |
| Plaque Properties (2 mm thick compression molding) | | | | | | | | | | | | |
| Tensile Strength at Break MPa | D-638 | 22.6 | 23.5 | 24.5 | 23.5 | 22.6 | 33 | 32.5 | 32 | 12 | 15 | 28 |
| Yield Point MPa | D-638 | 12 | 13 | 14 | 13 | 12 | 19 | 18.5 | 18 | 4 | 4 | 14 |
| Elongation at Break % | D-638 | 460 | 450 | 440 | 450 | 460 | 370 | 380 | 410 | 680 | 570 | 510 |
| 1% Secant Modulus MPa | D-638 | 125 | 135 | 150 | 135 | 125 | 280 | 280 | 280 | 22 | 27 | 210 |
| Shore D Hardness | D-2240 | 52 | 53 | 54 | 53 | 52 | 60 | 60 | 60 | 30 | 35 | 55 |

*Terpolymer ionomer

TABLE 5

| Resin/Property | ASTM Method | EX 1001 | EX 1004 | EX 1006 | EX 1007 |
|---|---|---|---|---|---|
| Cation | EXXON | Na | Zn | Na | Zn |
| Melt index (g/10 min) | D-1238 | 1.0 | 2.0 | 1.3 | 1.0 |
| Melting Point (C.) | D-3417 | 83.7 | 82.5 | 86 | 85.8 |
| Crystallisation Point (C.) | D-3417 | 41.3 | 52.5 | 47.5 | 52.3 |
| Plaque Properties (2 mm thick compression molding) | | | | | |
| Tensile Strength at Break MPa | D-638 | 34.4 | 20.6 | 33.5 | 24.1 |
| Yield Point MPa | D-638 | 21.3 | 14.0 | 19.3 | 13.8 |
| Elongation at Break % | D-638 | 341 | 437 | 421 | 472 |
| 1% Secant Modulus MPa | D-638 | 356 | 128 | 314 | 154 |
| 1% Flexural Modulus MPa | D-790 | 365 | 130 | 290 | 152 |
| Shore D Hardness | D-2240 | 63 | 53 | 58 | 51 |
| Vicat Softening Point | D-1525 | 51.5 | 55 | 57 | 60.5 |

Another embodiment of the invention is golf balls which employ, preferably as a cover, compositions of nylon homopolymer and/or copolymer and one or more olefin/alkyl acrylate/carboxylic acid terpolymer ionomers. Terpolymer ionomers which may be used with the nylon homopolymers preferably are ethylene/methyl acrylate/acrylic acid terpolymer ionomers. Nylon homopolymers for use in any of the compositions employed in the invention include but are not limited to nylon 6, nylon 66, and mixtures or copolymers thereof. Other nylons such as nylon 11, nylon 12, nylon 612, nylon 66/6 and nylon 46 also can be used as long as sufficient durability is achieved. In the case of nylon 6, a polyamide chain of about 140–222 repeating units is typically useful, but lower and higher molecular weight material may be employed. CAPRON 8202, a nylon 6 type polymer available from Allied Signal, is preferred. According to Allied Signal, CAPRON 8202 has the properties set forth in Table 6.

TABLE 6

| Property | Test Method (ASTM) | Value |
|---|---|---|
| Specific Gravity | D-792 | 1.13 |
| Yield Tensile Strength, psi (MPa) | D-638 | 11500 (80) |
| Ultimate Elongation % | D-638 | 70 |
| Flexural Strength, psi (MPa) | D-790 | 15700 (110) |
| Flexural Modulus, psi (MPa) | D-790 | 410,000 (2825) |
| Notched Izod Impact, ft-lbs/in | D-256 | 1.0 (55) |
| Heat Deflection Temp., @ 264 psi, ° C. | D-648 | 65 |
| Melting Point, ° C. | D-789 | 215 |
| Rockwell Hardness, R Scale | D-785 | 119 |

Terpolymer ionomers which may be employed include but are not limited to those having 50–98 wt %, preferably about 76–75 wt %, most preferably about 76 wt % ethylene, about 1–30 wt %, preferably about 15–20 wt %, most preferably about 18 wt % methyl acrylate, about 1–20 wt %, preferably about 4–10 wt %, most preferably about 6 wt % acrylic acid, wherein the acrylic acid has been neutralized by Zn, Li or Na or combinations thereof. Preferred terpolymer ionomers include IOTEK 7520, IOTEK 7510, ESCOR ATX 320-Li-80, or a mixture thereof. The nylon homopolymer may be present in the compositions an amount of about 1 wt % to about 99 wt %, preferably about 1 wt % to 50 wt %, most preferably about 15 wt % of the composition. The terpolymer ionomer may be about 99 wt % to about 1 wt %, preferably about 1 wt % to 50 wt %, most preferably about 85 wt %, all amounts based on total weight of the composition.

ZYTEL 408 is a nylon 66 modified molding compound containing ionomer. It is believed that ZYTEL 408 is an intimate mixture of polyamide and an ionomeric terpolymer of an $\alpha$-olefin, an acrylate ester, and an $\alpha$, $\beta$-ethylenically unsaturated mono- or dicarboxylic acid with a portion of the carboxylic acid groups being neutralized with metal ions. It is unknown to the present inventors whether ZYTEL 408 is a graft copolymer or a blend; however, ZYTEL 408 is believed to be a blend of nylon 66 and an ethylene alkylmethacrylate methacrylic acid terpolymer ionomer neutralized with Zn. The properties of ZYTEL 408, as provided by DuPont, are shown in Table 7.

TABLE 7

| Property | Test Method (ASTM) | Value[1] |
|---|---|---|
| Specific Gravity | D-792 | 1.09 |
| Tensile Strength (−40° F.) | D-638 | 15100 psi |
| Tensile Strength (−40° C.) | D-638 | 104.1 MPa |
| Flexural Modulus (−40° F.) | D-790 | 410,000 psi |
| Flexural Modulus (−40° C.) | D-790 | 2827 MPa |
| Izod Impact Strength at −40° F. | D-256 | 1.3 ft. lb./in. |
| Izod Impact Strength at −40° C. | D-256 | 69 J/m |
| Gardner Impact at −30° F. | D-3029 | >320 ft. lbs. |
| Heat Deflection temp. @ $1.8 \cdot 10^6$ Pa | D-648 | 75° C. |
| Melting Point | D-789 | 255° C. |

[1]Dry as molded, with about 0.2% water

A further embodiment of the invention is golf balls which employ, preferably as a cover, compositions of polyamide homopolymers or copolymers, and olefin/carboxylic acid copolymer ionomers made from two types of monomers such as IOTEK. The polyamides which can be used in the compositions employed in the invention include but are not limited to nylon 6, nylon 66, nylon 11, nylon 12, nylon 612, nylon 66/6, nylon 46 and mixtures thereof, as long as sufficient durability is achieved. Preferably, the nylon polymer is any of nylon 6 and nylon 66, most preferably nylon 6. In the case of nylon 6, a polyamide chain of about 140–222 repeating units is typically useful, but lower and higher molecular weight material may be employed. A preferred polyamide homopolymer is CAPRON 8202 available from Allied Signal. Useful copolymer ionomers include copolymer ionomers having about 99 wt % to 70 wt %, preferably about 90 wt % to 80 wt %, most preferably 85 wt % ethylene, about 1 wt % to about 30 wt %, preferably about 10 wt % to about 20 wt %, most preferably 15 wt % acrylic acid. A preferred ethylene/acrylic acid copolymer ionomer is IOTEK 7010 from Exxon Chemical Co. The copolymer ionomer may be present in the composition an amount of about 99 wt % to about 1 wt %, preferably about 95 wt % to about 70 wt %, most preferably about 80 wt % of the composition. The polyamide homopolymer may be about 1 wt % to about 99 wt %, preferably about 5 wt % to about 30 wt %, most preferably about 20 wt %, wherein all amounts are based on the total weight of the composition.

Two or more copolymer ionomers may be preblended prior to blending with polyamide homopolymers and/or RP to provide compositions which may be used in the invention. Thus, preblends of hard and soft copolymer ionomers, as well as preblends of high carboxylic acid copolymer ionomers and low carboxylic acid copolymer ionomers may be utilized to provide compositions for use in the invention. An Example of such a preblend is a mixture of IOTEK 8000 and IOTEK 7010.

Another embodiment of the invention is golf balls which employ, preferably as a cover, compositions of polyamide homopolymers or copolymers, and olefin/alkyl acrylate/carboxylic acid terpolymers. Useful terpolymers include terpolymers having about 50–98 wt %, preferably about 76–75 wt %, most preferably about 76 wt % olefin, preferably ethylene, about 1–30 wt %, preferably about 15–20 wt %, most preferably about 18 wt % alkyl acrylate, preferably methyl acrylate, and about 1–20 wt %, preferably about 4–10 wt %, most preferably about 6 wt % carboxylic acid, preferably acrylic acid. The terpolymer may be present in the composition an amount of about 1 wt % to about 99 wt %, preferably about 50 wt % to about 99 wt %, most preferably about 85 wt % of the composition. The polyamide homopolymer may be about 1 wt % to about 99 wt %, preferably about 1 wt % to about 50 wt %, most preferably about 15 wt %, wherein all amounts are based on the total weight of the composition. Useful polyamides may be of polyepsiloncaprolactam and polyhexamethyleneadipamide, more preferably nylon 6, nylon 66, nylon 11, nylon 12, nylon 612, nylon 66/6, nylon 46 and mixtures thereof. Preferably, the nylon polymer is any of nylon 6 and nylon 66, still more preferably nylon 6, most preferably the nylon homopolymer sold by Allied Signal under the trade name CAPRON 8202. A preferred ethylene/methyl acrylate/acrylic acid terpolymer is ESCOR ATX 320 from Exxon Chemical Co.

Two or more terpolymers may be preblended prior to blending with any of RP or the polyamide homopolymers to provide compositions which may be used in the invention. Thus, preblends of hard and soft terpolymers, as well as preblends of high carboxylic acid terpolymers and low carboxylic acid terpolymers may be utilized to provide compositions for use in the invention.

Although the compositions employed in the invention may be used in golf ball construction such as solid cores, one-piece balls and covers, these compositions are preferably employed as covers. Golf ball covers can be produced by injection molding or compression molding the nylon containing compositions employed herein over a wound or solid molded core, or a liquid core to produce a golf ball having a diameter of about 1.680 inches and weighing about 1.620 ounces. The core itself may be of a uniform composition, or may have two or more layers. The standards for both the diameter and weight for golf balls are established by the United States Golf Association (U.S.G.A.). Although the compositions employed in the invention can be used in solid core, two-piece and wound balls, solid and two-piece balls are preferred over wound balls due to their lower cost and superior performance. The term "solid cores" as used herein refers not only to one piece cores but also to multi-layer cores.

Golf balls of the invention may be produced by forming covers which include compositions of the invention around cores by conventional molding processes. The cover material is mixed in a rigorous mixing procedure, preferably using a twin screw extruder or the like and an extrusion temperature of 200–250° C. The cover compositions may be injection molded directly around the core while the core is positioned in the center of a golf ball mold at temp of about 350 F. to about 450 F. In compression molding, the cover composition is first injection molded at about 380 F. to about 450 F. to provide smooth surfaced hemispherical shells. The shells are then positioned around the core in a dimpled golf ball mold and compression molded at about 230–300 F. for about 2 minutes to about 10 minutes at a pressure sufficient to retain the mold in a closed position. Thereafter, the mold is cooled at about 50 F. to about 70 F. for about 2 minutes to about 10 minutes to fuse the shells together to form a unitary ball. After molding, the resulting golf balls may undergo various further processing steps such as buffing, painting and marking.

The present invention is further illustrated by the following non-limiting examples set forth below. In Tables 8–17 which include data for the examples, the compositions are injection molded at 420–480° F. (depending upon nylon content) around identical solid cores which have a finished diameter of 1.545" to produce golf balls about 1.680" in diameter having nominal cover thickness of 0.0675 inches. Each example represents the average data for one dozen balls produced according to the invention. The properties for the balls listed in the examples are measured according to the following procedures:

The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (COR) and the surface configuration (dimple pattern, ratio of land area to dimple area, etc.) of the ball.

The COR in solid core balls is a function of the composition of the molded core and of the cover. The molded core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers.

The coefficient of restitution is the ratio of the outgoing velocity to the incoming velocity. In the examples of this application, the coefficient of restitution of a golf ball was measured by propelling a ball horizontally at a speed of 125±5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex., which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 0.2 inches thick.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

Cold cracking resistance is measured by firing a ball, having been previously stored at 10 F. for 24 hours, at a velocity of 165 ft/sec from an air cannon against a steel plate positioned 12 feet from the muzzle of the cannon. The ball is fired 5 times against the plate. After allowing the ball to equilibrate to room temperature, the ball is visually inspected to identify cracks in the cover. One or more cracks, no matter how small, constitute failure.

The term "compression" utilized in the golf ball trade generally defines the overall deflection that a golf ball undergoes when subjected to a compressive load. For example, PGA compression indicates the amount of change in golf ball's shape upon striking. The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multilayer solid core balls exhibit much more consistent compression readings than balls having wound cores such as the thread wound three-piece balls.

In the past, PGA compression related to a scale of from 0 to 200 given to a golf ball. The lower the PGA compression value, the softer the feel of the ball upon striking. In practice, tournament quality balls have compression ratings around 70–110, preferably around 80 to 100.

In determining PGA compression using the 0–200 scale, a standard force is applied to the external surface of the ball. A ball which exhibits no deflection (0.0 inches in deflection) is rated 200 and a ball which deflects ²⁄₁₀th of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200–100) and a ball which deflects 0.110 inches (110×0.001 inches) has a PGA compression of 90 (i.e., 200–110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable springloaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle Bros. Testing Machine Company, Phil., Pa. to evaluate compression of the various components (i.e., cores, mantle cover balls, finished balls, etc.) of the golf balls. The Riehle compression device determines deformation in thousandths of an inch under a fixed initialized load of 200 pounds. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression=160—Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is know. These devices have been designed, such as a Whitney Tester, to correlate or correspond to PGA compression through a set relationship or formula.

Figure 1:
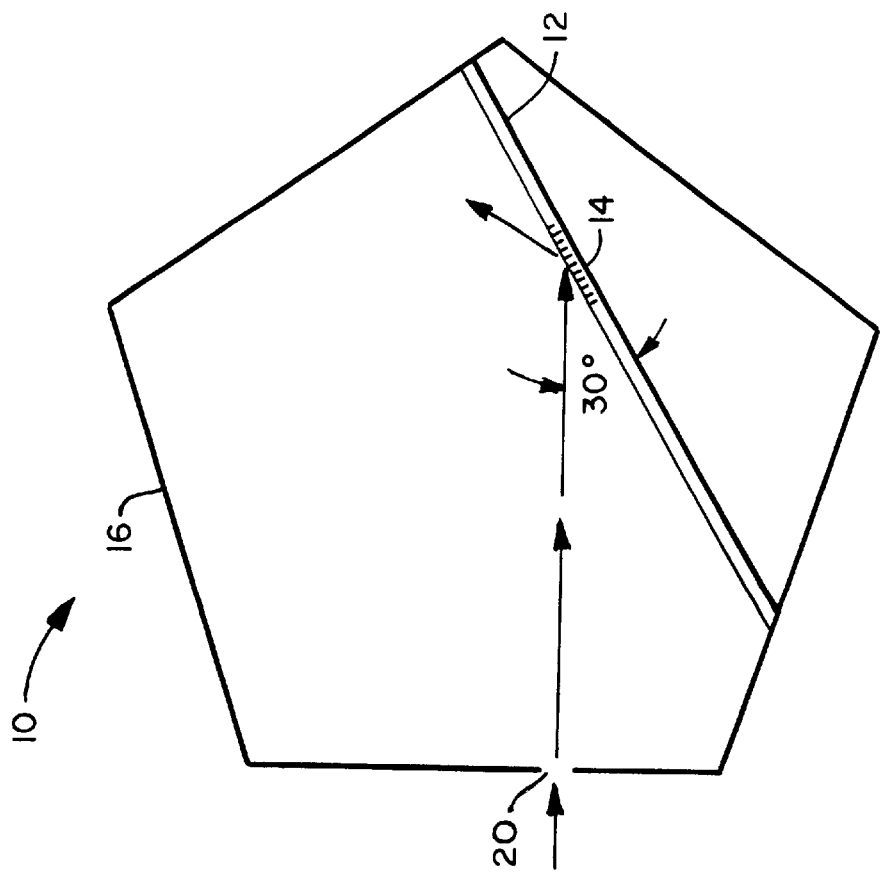
FIG. 1 schematically shows the durability test apparatus used to determine the durability of the golf balls of the invention.

Durability is determined by firing a golf ball at 135 ft/sec (at 72° F.) into 5-sided steel pentagonal container, the walls of which are steel plates. The container 10, which is shown schematically in FIG. 1, has a 19½ inch long insert plate 12 mounted therein, the central portion 14 of which has horizontally extending square grooves on it which are intended to simulate a square grooved face of a golf club. The grooves, which are shown in an exaggerated form in FIG. 2, have a width 30 of 0.033 inches, a depth 32 of 0.100 inches, and are spaced apart from one another by land areas 34 having a width of 0.130 inches. The five walls 16 of the pentagonal container each have a length of 14½ inches. The inlet wall is vertical and the insert plate is mounted such that it inclines upward 60° relative to a horizontal plane away from opening 20 in container 10. The ball travels 15½–15¾ inches horizontally from its point of entry into the container 10 until it hits the square-grooved central portion 14 of insert plate 12. The angle between the line of trajectory of the ball and the insert plate 12 is 30°. The balls are subjected to 70 or more blows (firings) and are inspected at regular intervals for breakage (i.e., any signs of cover cracking or delamination). If a microcrack forms in a ball, its speed will change and the operator is alerted. The operator then visually inspects the ball. If the microcrack cannot yet be observed, the ball is returned to the test until a crack can be visually detected.

A ball is assigned a Durability Rating according to the following scale. A sample of twelve balls of the same type are obtained and are tested using the durability test apparatus described in the previous paragraph. If less than all of the balls in the sample survive 70 blows each without cracking, the ball is assigned a Durability Rating of 1. If all of the balls survive 70 blows and one or two of the twelve balls crack before 100 blows, the ball is assigned a Durability Rating of 2. If all twelve balls in the sample survive 100 blows each, but seven or more balls crack at less than 200 blows each, the ball is assigned a Durability Rating of 3. If all twelve balls in the sample survive 100 blows and at least six out of the twelve balls in the sample also survive 200 blows, the ball is assigned a Durability Rating of 4.

The spin rate of the golf ball is measured by striking the ball with a 9-iron wherein the club-head speed is about 105 feet per second and the ball is launched at an angle of 26 to 34 degrees with an initial velocity of about 110–115 feet per second. The spin is measured by observing the rotation of the ball in flight using stop action strobe photography.

"Shore D hardness" of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

EXAMPLES 1–28

Use of Nylon-Containing Ionomers in Golf Ball Covers

By blending the ingredients set forth in Tables 8–10 and 13, cover compositions were produced and injection molded around a core to yield a two piece ball as described above. The balls were then evaluated. The results are shown below:

Examples 1–3

Examples 1–3 in Table 8 illustrate golf balls formed from compositions which include RP (CAPRON 8351) with ethylene/methyl acrylate/acrylic acid terpolymers (ESCORATX 325), and compositions formed from RP (CAPRON 8351) with Zn neutralized ethylene/methyl acrylate/acrylic acid terpolymer ionomers (IOTEK 7520, and IOTEK 7510). The cover material was blended in a single screw extruder. Cold cracking of Examples 1 and 2 may have been a result of molding problems.

TABLE 8

| Example/component (grams) | 1 | 2 | 3 |
|---|---|---|---|
| IOTEK 7520 | — | 1500 | — |
| IOTEK 7510 | — | — | 1500 |
| CAPRON 8351 | 1500 | 1500 | 1500 |
| ESCOR ATX 325 | 1500 | — | — |
| Cold Crack Resistance | 2 cracks at 2 blows 4 cracks at 3 blows | 2 cracks at 3 blows 3 cracks at 5 blows | — |
| Durability - 300 hits | No Failures | No Failures | |

Examples 4–9

Examples 4–9 in Table 9 show compositions of nylon homopolymers (CAPRON 8202) with ethylene/acrylic acid copolymer ionomers (IOTEK 7010 and IOTEK 8000), blends of ethylene/acrylic acid ionomers (IOTEK 7010 and IOTEK 8000), compositions of nylon homopolymers (CAPRON 8202) with terpolymers (ESCOR ATX 320) and terpolymer ionomers such as (ESCOR ATX-320-Li-80), and of nylon homopolymers (CAPRON 8202) and terpolymers (ESCOR ATX 320) are shown. Blends A, B, C and D were each pre-extruded in a single screw extruder and were molded over cores having the same formulation, a Riehle compression in the range of 61–69 and a COR in the range of 0.766–0.778. Example 5 was a control in which no nylon was used. Examples 4 and 6–9 show that Nylon 6 can be blended with ionomeric copolymers to make a durable golf ball if sufficient mixing occurs. It was surprising that the inclusion of 10% nylon (Example 4) produced a cover that had nearly the same durability as Control Example 5. In Example 6, a preextrusion of zinc ionomer (IOTEK 7010) with nylon, followed by dry blending with sodium ionomer unexpectedly resulted in better durability than the balls of Example 4 although the covers of Examples 4 and 6 had the same overall composition. While the covers of Examples 7 and 8 were expected to break as a result of incompatibility, it was instead found that terpolymer and terpolymer ionomer were compatible with nylon, and no cracking occurred in the 300-blow durability test.

TABLE 9

| Example/ Component (grams) | 4 | 5 (control) | 6 | 7 | 8 | 9 |
|---|---|---|---|---|---|---|
| Blend A[1] | 2000 | — | — | — | — | — |
| Blend B[2] | — | — | — | — | 2000 | — |
| Blend C[3] | — | — | — | 2000 | — | — |
| Blend D[4] | — | — | 650 | — | — | 1000 |
| IOTEK 8000 | — | 1500 | 1350 | — | — | — |
| IOTEK 7010 | — | 500 | — | — | — | — |
| Compression (Reihle) | 59 | 60 | 59 | 74 | 75 | 60 |
| Coefficient of Restitution | 0.804 | 0.805 | 0.806 | 0.783 | 0.767 | 0.798 |
| Durability[5] | | | | | | |
| 100 blows | 12 | 12 | 12 | 12 | 12 | 12 |
| 200 blows | 12 | 12 | 12 | 12 | 12 | 12 |
| 300 blows | 7 | 8 | 9 | 12 | 12 | 5 |

[1]Sample taken from mixture of 2025 g IOTEK 8000, 675 g IOTEK 7010, and 300 g CAPRON 8202.
[2]Sample taken from mixture of 2700 g ESCOR ATX 320 and 300 g CAPRON 8202.
[3]Sample taken from mixture of 1350 g ESCOR ATX 320, 1350 g ESCOR ATX 320-Li-80, and 300 g CAPRON 8202.
[4]Sample taken from mixture of 1350 g IOTEK 7010 and 600 g CAPRON 8202.
[5]Number of balls out of 12 which survived 100 blows, 200 blows and 300 blows

Examples 10–14

Examples 10–14 in Table 10 illustrate compositions which employ one or more copolymer ionomers (IOTEK, SURLYN) with ZYTEL. These compositions were prepared and molded into golf balls according to the procedures above. The materials were blended using a single screw extruder. Example 11 produced the "best" ball of this set of Examples due to its high COR.

TABLE 10

| Example/Component | 10 | 11 | 12 | 13 | 14 |
|---|---|---|---|---|---|
| IOTEK 4000 | 35 wt % | 42.5 wt % | — | — | — |
| IOTEK 8000 | 35 wt % | 42.5 wt % | — | — | — |
| SURLYN 9910 | — | — | 85 wt % | — | — |
| SURLYN 9320 | — | — | — | 75 wt % | 50 wt % |
| ZYTEL 408 | 30 wt % | 15 wt % | 15 wt % | 25 wt % | 50 wt % |
| COR | 0.784 | 0.812 | 0.803 | 0.784 | 0.782 |
| Compression (Reihle) | 53 | 54 | 56 | 65 | 61 |
| Hardness Shore D | 70 | 70 | 67 | 50 | 62 |

Example 15

Example 15 illustrates use of RP in the form of CAPRON 8351 as the cover of a golf ball. The core had a Riehle compression in the range of 85–95 and a COR in the range of 0.772–0.789 and was the same type of core as was used in Examples 16–44. The performance of this ball is shown in Table 13. The resulting ball had low spin and high hardness, which would make it useful for a high handicap player.

Examples 16–20

RP (CAPRON 8351) was admixed with blend BX1 that included a Na neutralized ethylene/acrylic acid copolymer ionomer, a first Zn neutralized ethylene/acrylic acid copolymer ionomer, and a component mixture (masterbatch). The component mixture included a second Zn neutralized ethylene/acrylic acid copolymer ionomer. The second Zn neutralized ethylene/acrylic acid ionomer was different from the first Zn neutralized ethylene/acrylic acid copolymer ionomer.

More specifically, in examples 16–20, CAPRON 8351 was blended with blend BX1. In blend BX1, the first Na neutralized ethylene/acrylic acid copolymer ionomer was IOTEK 8000 in an amount of 70 wt % of blend BX1. The first Zn neutralized ethylene/acrylic acid copolymer ionomer was IOTEK 7010 in an amount of 20 wt % of blend BX1. The component mixture formed 10wt % of blend BX1. The component mixture contained IOTEK 7030 as the second Zn neutralized ethylene/acrylic acid copolymer ionomer in an amount of 75 wt % of the component mixture. The component mixture also included 24 wt % of UV stabilizer, 0.26 wt % brightener, 0.46 wt % dye and 0.04 wt % antioxidant. Blend BX1 was produced by dry blending the Na and Zn copolymer ionomers with the component mixture. The component mixture employed in the blend BX1 was produced by melt extruding the ingredients of the component mixture at a temperature of about 380 F. Mixing of RP and blend BX1 took place using a twin screw extruder designed for intensive mixing. The RP was melt mixed with blend BX1 at a temperature of about 450 F. The resulting compositions then were molded into covers and balls as described above. The performance of balls according to examples 16–20 is shown in Table 13.

Stated more generally, when CAPRON 8351 and blend BX1 are used to form a golf ball cover, CAPRON 8351 is about 1 to 99 wt %, preferably about 20 wt % to about 80 wt %, more preferably about 20 wt % of the composition, and blend BX1 is about 1 to 99 wt %, preferably about 20 to about 80 wt % of the composition, more preferably about 80 wt % of the composition. In blend BX1, the first Zn neutralized ethylene/acrylic acid copolymer ionomer is about 1 to about 90 wt %, preferably about 20 wt % of blend BX1, the Na neutralized ethylene/acrylic acid copolymer ionomer is about 1 to about 90 wt %, preferably about 70 wt % of blend BX1, and the component mixture is about 1 to about 30 wt %, preferably about 10 wt % of blend BX1. Preferably, the second Zn neutralized ethylene/acrylic acid copolymer ionomer in the component mixture is about 75 wt % of the component mixture, with the remainder being additives such as stabilizers for oxidative degradation, stabilizers for thermal degradation, stabilizers for ultraviolet light degradation, inhibitors for oxidative degradation, inhibitors for thermal degradation, inhibitors for ultraviolet light degradation, lubricants, plasticizers, dyes, pigments, fibrous fillers, particulate fillers, and reinforcement nucleating agents. In this embodiment, a wide variety of Na ionomers including but not limited to those listed in Table 4, preferably IOTEK 8000 may be employed. The first Zn copolymer ionomer may be, for example, any of those listed in Table 4, preferably IOTEK 7010. The second Zn copolymer ionomer may be, for example, any of those listed in Table 4, preferably IOTEK 7030. The aforesaid component mixture preferably includes about 75 wt % IOTEK 7030, remainder additives.

As shown by the results in Table 13, the addition of nylon increased the hardness and COR of the balls, increased distance slightly, and reduced spin. It is important to note that the mixture of CAPRON 8351 with ionomer resulted in a highly durable product except in Example 17, in which the balls broke early. The poor results of Example 17 may have been caused by inadequate molding.

Examples 21–24

RP (CAPRON 8351) and blend BX2 that includes a Na neutralized ethylene/acrylic acid copolymer ionomer, a Zn neutralized ethylene/acrylic acid copolymer ionomer, and the above described component mixture were employed in a golf ball as a golf ball cover. Mixing of RP and blend BX2 took place using a twin screw extruder designed for intensive mixing.

In examples 21–24, the first Zn neutralized ethylene/acrylic acid copolymer ionomer was EX1003 in an amount of 45% of blend BX2, the Na neutralized ethylene/acrylic acid copolymer ionomer was EX1002 in an amount of 45 wt % of blend BX2, and the component mixture was 10 wt % of blend BX2. The second Zn neutralized ethylene/acrylic acid copolymer ionomer in the component mixture was IOTEK 7030 in an amount of 75 wt % of the component mixture. The component mixture also included 24 wt % UV stabilizer, 0.26 wt % brightener, 0.46 wt % dye and 0.04 wt % antioxidant. The performance of balls with these covers is shown in examples 21–24 of Table 13.

Stated more generally, in this embodiment, CAPRON 8351 is about 1 to about 99 wt %, preferably about 20–80 wt %, more preferably about 20 wt % of the composition, and blend BX2 is about 1 to about 99 wt %, preferably about 20–80 wt %, more preferably about 80 wt % of the composition. In blend BX2, the Na neutralized ethylene/acrylic acid copolymer ionomer is about 1 to about 90 wt %, preferably about 45 wt % of blend BX2, the Zn neutralized ethylene/acrylic acid copolymer ionomer is about 1 to about 90 wt %, preferably about 45 wt % of blend BX2, and the component mixture is about 1 to 30 wt %, preferably about 10 wt % of blend BX2. In this embodiment, the preferred Na neutralized ionomer is EX1002 and the preferred Zn ionomer is EX1003. EX1002 and EX1003 are provided by Exxon Chemical Co. and the properties of EX1002 and EX1003 are shown in Table 11 below.

TABLE 11

| Resin/Property | ASTM Method | EX 1002 | EX 1003 |
| --- | --- | --- | --- |
| Cation | | Na | Zn |
| Melt Index (g/10 min) | D-1235 | 1.6 | 1.1 |
| Melting Point (C.) | D-3417 | 83.7 | 82 |
| Crystallization Point (C.) | D-3417 | 43.2 | 51.5 |
| Plaque Properties (2 mm thick compression molding) | | | |
| Tensile Strength at Break MPa | D-638 | 31.7 | 24.8 |
| Yield Point MPa | D-638 | 22.5 | 14.9 |
| Elongation at Break % | D-638 | 348 | 387 |
| 1% Secant Modulus MPa | D-638 | 418 | 145 |
| 1% Flexural Modulus MPa | D-790 | 380 | 147 |
| Shore D Hardness | D-2240 | 62 | 54 |
| Vicat Softening Point | D-1525 | 51.5 | 56 |

EX1002 is made by neutralizing an ethylene/acrylic acid copolymer having about 18 wt % acrylic acid and a melt index of about 28 with Na to achieve a Na neutralized ethylene/acrylic acid copolymer ionomer that has a melt index of about 1. EX1003 is made by neutralizing an ethylene/acrylic acid copolymer having about 18 wt % acrylic acid having a melt index of about 28 with Zn to yield a Zn neutralized ethylene/acrylic acid ionomer having a melt index of about 1. Blend BX2 is made in the manner employed to make blend BX1. CAPRON 8351 and blend BX2 then are blended together. The resultant compositions then are formed into golf ball covers and golf balls as described above.

As was the case in Examples 16–20, Examples 21–24 also show that the addition of nylon increases the hardness and COR of the golf balls, and increases distance slightly while reducing spin.

Examples 25–28

RP (CAPRON 8351) with blend BX3 that included a Na neutralized ethylene/acrylic acid copolymer ionomer, a Zn neutralized ethylene/acrylic acid copolymer ionomer, and the above described component mixture were employed in a golf ball as a golf ball cover. Mixing of RP with blend BX3 was conducted using a twin screw extruder designed for intensive mixing. In examples 25–28, the first neutralized ethylene/acrylic acid copolymer ionomer was EX 990 in an amount of 45 wt % of blend BX3, the Na neutralized ethylene/acrylic acid copolymer ionomer was EX 989 in an amount of 45 wt % of blend BX3, and the component mixture was 10 wt % of blend BX3. The second Zn neutralized ethylene/acrylic acid copolymer ionomer in the component mixture was IOTEK 7030 in an amount of 75 wt % of the component mixture. The component mixture also included 24 wt % UV stabilizer, 0.26 wt % brightener, 0.46 wt % dye and 0.04 wt % antioxidant. The properties of EX 989 and EX 990, as provided by Exxon, are shown in Table 12. The performance of balls with covers of these compositions is shown in examples 25–28 of Table 13.

Stated more generally, in this embodiment, CAPRON 8351 is about 1 to about 99 wt %, preferably about 20–80 wt %, more preferably about 20 wt % of the composition, and blend BX3 is about 1 to about 99 wt %, preferably about 20–80 wt %, more preferably about 80 wt % of the composition. In blend BX3, the Na neutralized ethylene/acrylic acid copolymer ionomer is about 1 to about 90 wt %, preferably about 45 wt % of blend BX3, the first Zn neutralized ethylene/acrylic acid copolymer ionomer is about 1 to 90 wt %, preferably about 45 wt % of blend BX3, and the component mixture is about 1 to 30 wt %, preferably about 10 wt % of blend BX3. In this embodiment, the preferred Na ionomer is EX 989. The preferred Zn copolymer ionomer is EX 990. EX 989 is made by *neutralizing an ethylene/acrylic acid copolymer that has about 18 wt % acrylic acid and a melt index of about 100 with Na. EX 990 is made by neutralizing an ethylene/acrylic acid copolymer that has about 18 wt % acrylic acid and a melt index of about 100 with Zn. EX 989 and EX 990 are available from Exxon Chemical Co.

As indicated by the results on Table 13, CAPRON 8351 produces a golf ball with excellent durability, as well as a very high coefficient of restitution and good distance, when used in combination with BX3.

Examples 20, 21 and 25 were controls. In each set of Examples 16–20, 21–24 and 25–28, intermolecular interactions are believed to have caused, or at least contributed to, the reduction in melt index for the blends as compared to the pure materials. Durability of the covers containing 20 wt % CAPRON 8351 is better than durability of covers containing 40 wt % CAPRON 8351. However, the 40 wt % CAPRON 8351 covers met the durability standard for commercial golf balls and resulted in a harder cover.

TABLE 12

| Resin/Property | EX 989 | EX 990 |
| --- | --- | --- |
| Melt Index (g/10 min) | 1.3 | 1.24 |
| Cation type | Na | Zn |
| Density (kg/m$^3$) | 959 | 977 |
| Vicat Softening Temp. (C.) | 52/5 | 55.0 |
| Crystallization Temp. (C.) | 40.1 | 54.4 |
| Melting Point (C.) | 92.6 | 81.0 |
| Tensile at Yield (MPa) | 23.8 | 16.5 |
| Tensile at Break (MPa) | 32.3 | 23.8 |
| Elongation at Break (%) | 330 | 357 |
| 1% Secant Modulus (MPa) | 389 | 205 |
| Flexural Modulus (MPa) | 340 | 183 |
| Hardness (Shore D) | 62 | 56 |
| Zwick Rebound (%) | 61 | 48 |

TABLE 13

| EX | % BX3 | % BX2 | % BX1 | % C8351 | MOLD TEMP[1] | MI[2] | SIZE[3] | WT[4] | COMP[5] | COR[6] | HARD[7] | SPIN[8] | DIST | DUR[9] | 100[10] blows | 200[11] blows | 300[12] blows |
|---|---|---|---|---|---|---|---|---|---|---|---|---|---|---|---|---|---|
| 15 | | | 0 | 100 | 465 | 5.51 | 1.679 | 45.92 | 56 | 808 | 77 | 5514 | 251.3** | 258 | 12 | 10 | 9 |
| 16 | | | 20 | 80 | 465 | 3.13 | 1.677 | 45.57 | 60 | 801 | 75 | 5984 | 248.1** | 155 | 9 | 2 | 0 |
| 17 | | | 40 | 60 | 460 | 0.43 | 1.68 | 45.52 | 65 | B[13] | 73 | 6891 | 235.0** | —[13] | — | — | — |
| 18 | | | 60 | 40 | 450 | 0.9 | 1.68 | 45.41 | 71 | 803 | 72 | — | 248.8** | 197 | 12 | 6 | 0 |
| 19 | | | 80 | 20 | 430 | 3.23 | 1.68 | 45.27 | 73 | 806 | 69 | 7777 | 249.6** | 278 | 12 | 12 | 4 |
| 20 | | | 100 | 0 | 430 | 9.49 | 1.68 | 45.13 | 75 | 807 | 67 | 8375 | 248.1** | 335 | 12 | 12 | 8 |
| 21 | | 100 | | 0 | 430 | 17.5 | 1.679 | 45.22 | 68 | 821 | 72 | 7028 | 264.7* | 171 | 12 | 0 | 0 |
| 22 | | 80 | | 20 | 430 | 7.5 | 1.68 | 45.3 | 66 | 818 | 73 | 6988 | 263.8* | 239 | 12 | 5 | 5 |
| 23 | | 60 | | 40 | 450 | 1.45 | 1.681 | 45.6 | 65 | 815 | 74 | 6434 | 262.8* | 139 | 9 | 1 | 0 |
| 24 | | 40 | | 60 | 460 | 0.62 | 1.678 | 45.56 | 61 | 781 | 75 | 6300 | 264.2* | —[13] | — | — | — |
| 25 | 100 | | | 0 | 430 | 15.8 | 1.68 | 45.26 | 68 | 819 | 72 | 6707 | 266.0* | 157 | 12 | 1 | 0 |
| 26 | 80 | | | 20 | 430 | 8.08 | 1.68 | 45.32 | 67 | 819 | 73 | 6842 | 265.0* | 253 | 12 | 7 | 4 |
| 27 | 60 | | | 40 | 430 | 2.8 | 1.679 | 45.38 | 66 | 816 | 75 | 6257 | 266.1* | 172 | 11 | 2 | 0 |
| 28 | 40 | | | 60 | 460 | 1.39 | 1.681 | 45.73 | 62 | 813 | 77 | 6013 | 261.7* | 55 | 1 | 0 | 0 |

[1]Degrees F.
[2]Melt Index--g/10 min
[3]Diameter in inches
[4]Weight in grams
[5]Riehle Compression
[6]Coefficient of Restitution
[7]Hardness--Shore D
[8]revs. per min.
[9]Durability--Average No. of hits to failure
[10]Number of balls out of 12 which survived 100 blows
[11]Number of balls out of 12 which survived 200 blows
[12]Number of balls out of 12 which survived 300 blows
[13]Broke
*Yards total distance after impact with Top Flight Tour metal wood having 10.5 Deg. loft at 157.96 ft/sec onto firm turf
**Yards total distance after impact with Top Flight Tour metal wood having 12 Deg. loft at 163.3 ft/sec onto soft turf Examples 29–44

Use of Blends of Copolymer Ionomer and Nylon in Golf Ball Covers

Examples 29–34

CAPRON 8202 with the aforementioned blend BX1 was employed as a cover in a golf ball. The CAPRON 8202 and blend BX1 were mixed using a twin screw extruder designed for intensive mixing.

In examples 29–34, the Na neutralized ethylene/acrylic acid copolymer ionomer was IOTEK 8000 in an amount of 70 wt % of blend BX1, the first Zn neutralized ethylene/acrylic acid copolymer ionomer was IOTEK 7010 in an amount of 20 wt % of blend BX1, and the component mixture is 10 wt % of blend BX1. The second Zn neutralized ethylene/acrylic acid copolymer ionomer in the component mixture was IOTEK 7030 in an amount of 75 wt % of the component mixture. The component mixture also included 24 wt % of UV stabilizer, 0.26 wt % brightener, 0.46 wt % dye and 0.04 wt % antioxidant. The performance of balls which employ those covers is shown as examples 29–34 in Table 14 below.

Stated more generally, in this embodiment, CAPRON 8202 is about 1 to about 50 wt %, preferably about 20–50 wt %, more preferably about 20 wt % of the composition, and blend BX1 is about 50 to 99 wt %, preferably about 50–80 wt %, more preferably about 80 wt % of the composition as long as a Durability Rating of at least 2 is obtained. The compositions are formed into golf ball covers and golf balls as described above.

TABLE 14

| EX | % BX3 | % BX2 | % BX1 | % C8202 | MOLD TEMP[1] | MI[2] | SIZE[3] | WT[4] | COMP[5] | COR[6] | HARD[7] | SPIN[8] | DIST | DUR[9] | 100[10] blows | 200[11] blows | 300[12] blows |
|---|---|---|---|---|---|---|---|---|---|---|---|---|---|---|---|---|---|
| 29 | | | 0 | 100 | 465 | 14.38 | 1.68 | 46.3 | 43 | B[13] | 80 | 7412 | — | —[13] | — | — | — |
| 30 | | | 20 | 80 | 465 | 15.9 | 1.68 | 46.02 | 50 | B[13] | 78 | — | — | —[13] | — | — | — |
| 31 | | | 40 | 60 | 460 | 5.32 | 1.68 | 45.76 | 57 | B[13] | 75 | — | — | —[13] | — | — | — |
| 32 | | | 60 | 40 | 450 | 1.73 | 1.68 | 45.54 | 67 | 808 | 72 | 7056 | 251.6** | 69 | 1 | 0 | 0 |
| 33 | | | 80 | 20 | 430 | 5.68 | 1.68 | 45.4 | 71 | 809 | 70 | 7845 | 250.9** | 178 | 12 | 2 | 0 |
| 34 | | | 100 | 0 | 430 | 9.49 | 1.68 | 45.13 | 75 | 807 | 67 | 8375 | 248.1** | 335 | 12 | 12 | 8 |
| 35 | | 100 | | 0 | 430 | 17.5 | 1.68 | 45.22 | 68 | 821 | 72 | 7028 | 264.7* | 171 | 12 | 0 | 0 |
| 36 | | 80 | | 20 | 430 | 6.23 | 1.68 | 45.44 | 66 | 821 | 73 | 6375 | 265.5* | 103 | 11 | 0 | 0 |
| 37 | | 60 | | 40 | 450 | 2.21 | 1.68 | 45.33 | 63 | 821 | 75 | 5826 | 265.8* | 93 | 9 | 0 | 0 |
| 38 | | 40 | | 60 | 460 | 7.49 | 1.68 | 45.96 | 54 | B[13] | 80 | 4708 | — | —[13] | — | — | — |
| 39 | | | 0 | 100 | 465 | 14.38 | 1.68 | 46.3 | 43 | B[13] | 80 | 7412 | — | —[13] | — | — | — |
| 40 | 100 | | | 0 | 430 | 15.8 | 1.68 | 45.26 | 68 | 819 | 72 | 6707 | 266* | 156 | 12 | 1 | 0 |
| 41 | 80 | | | 20 | 430 | 6.88 | 1.79 | 45.39 | 66 | 821 | 74 | 6607 | 266.5* | 186 | 12 | 3 | 1 |
| 42 | 60 | | | 40 | 450 | 3.86 | 1.68 | 45.67 | 62 | 824 | 77 | 5656 | 267.1** | 150 | 12 | 1 | 0 |

TABLE 14-continued

| EX | % BX3 | % BX2 | % BX1 | % C8202 | MOLD TEMP[1] | MI[2] | SIZE[3] | WT[4] | COMP[5] | COR[6] | HARD[7] | SPIN[8] | DIST | DUR[9] | 100[10] blows | 200[11] blows | 300[12] blows |
|---|---|---|---|---|---|---|---|---|---|---|---|---|---|---|---|---|---|
| 43 | 40 | | | 60 | 460 | 7.49 | 1.683 | 45.92 | 53 | B[13] | 80 | B[13] | — | —[13] | — | — | — |
| 44 | 0 | | | 100 | 465 | 14.38 | 1.68 | 46.3 | 43 | B[13] | 80 | 7412 | — | —[13] | — | — | — |

[1]Degrees F.
[2]Melt Index--g/10 min
[3]Diameter in inches
[4]Weight in grams
[5]Riehle Compression
[6]Coefficient of Restitution
[7]Hardness--Shore D
[8]RPM
[9]Durability--Average No. of hits to failure
[10]Number of balls out of 12 which survived 100 blows
[11]Number of balls out of 12 which survived 200 blows
[12]Number of balls out of 12 which survived 300 blows
[13]Broke
*Yards total distance after impact with Top Flight Tour metal wood having 10.5 Deg. loft at 157.96 ft/sec onto firm turf
**Yards total distance after impact with Top Flight Tour metal wood having 12 Deg. loft at 163.3 ft/sec onto soft turf Examples 35–39

CAPRON 8202 with the aforementioned blend BX2 was employed as a cover in a golf ball. The CAPRON 8202 and blend BX2 were mixed using a twin screw extruder designed for intensive mixing.

In Examples 35–39, the Na neutralized ethylene/acrylic acid copolymer ionomer was EX 1002 in an amount of 45 wt % of blend BX2, the first Zn neutralized ethylene/acrylic acid copolymer ionomer was EX 1003 in an amount of 45 wt % of blend BX2, and the component mixture was 10 wt % of blend BX2. The second Zn neutralized ethylene/acrylic acid copolymer ionomer in the component mixture was IOTEK 7030 in an amount of 75 wt % of the component mixture. The component mixture also included 24 wt % UV stabilizer, 0.26 wt % brightener, 0.46 wt % dye and 0.04 wt % antioxidant. The performance of balls with those covers is shown in Examples 35–39 of Table 14 above.

Stated more generally, in this embodiment, CAPRON 8202 is about 1 to about 50 wt %, preferably about 20–50 wt %, more preferably about 20 wt % of the composition, and blend BX2 is about 50 to about 99 wt %, preferably about 50–80 wt %, more preferably about 80 wt % of the composition as long as a minimal Durability Rating of 2 is obtained. The compositions are formed into golf ball covers and golf balls as described above.

Examples 40–44

CAPRON 8202 with blend BX3 was employed as a golf ball cover of a golf ball. The CAPRON 8202 and blend BX3 were mixed using a twin screw extruder designed for intensive mixing. In Examples 40–44, the first Zn neutralized ethylene/acrylic acid copolymer ionomer was EX 990 in an amount of 45 wt % of blend BX3, the Na neutralized ethylene/acrylic acid copolymer ionomer was EX 989 in an amount of 45 wt % of blend BX3, and the component mixture was 10 wt % of blend BX3. The second Zn neutralized ethylene/acrylic acid copolymer ionomer in the component mixture was IOTEK 7030 in an amount of 75 wt % of the component mixture. The component mixture also included 24 wt % UV stabilizer, 0.26 wt % brightener, 0.46 wt % dye and 0.04 wt % antioxidant. The performance of balls with those covers is shown in Examples 40–44 of Table 14 above.

Stated more generally, in this embodiment, CAPRON 8202 is about 1 to about 50 wt. %, preferably about 20–50 wt. %, more preferably about 20 wt. % of the composition, and blend BX3 is about 50 to about 99 wt. %, preferably about 50–80 wt. %, more preferably 80 wt. % of the composition as long as a minimal Durability Rating of 2 is obtained. The compositions are formed into golf ball covers and golf balls as described above.

Examples 45–59

Use of Blends of Terpolymer Ionomer and Nylon in Golf Ball Covers

CAPRON 8351 was blended in different amounts with four different ionomeric or non-ionomeric terpolymers, namely SURLYN 9320, IOTEK 7520, ATX 320-Li-40 and DS3076 (Chevron Chemical Co.). DS3076 is an extrusion grade sodium ionomer resin with a melt index of 0.5 g/10 min (ASTM D-1238) and a flexural modulus of 34,400 psi (ASTM D-790-66). Blending took place in a twin screw extruder designed for intensive mixing. The weight percentages of CAPRON 8351 and the terpolymer materials are shown on Table 15 below. The blend was employed as a cover of a golf ball. The covers were placed over cores having the same formulation, Riehle compression in the range of 82–92, and COR in the range of 0.785–0.805. The physical properties and performance of the resulting balls is shown on Table 15. The inclusion of nylon increased cover hardness and reduced ball spin.

On Table 15, scuff resistance measurements were determined as follows:

A Top-Flite tour pitching wedge (1994) with box grooves was obtained and was mounted in a Miyamae driving machine. The club face was oriented for a square hit. The forward/backward tee position was adjusted so that the tee was four inches behind the point in the downswing where the club was vertical. The height of the tee and the toe-heel position of the club relative to the tee were adjusted in order that the center of the impact mark was about ¾ of an inch above the sole and was centered toe to heel across the face. The machine was operated at a club head speed of 125 feet per second. A minimum of three samples of each ball were tested. Each ball was hit three times.

After testing, the balls were rated according to the following table:

| Rating | Type of damage |
|---|---|
| 1 | Little or no damage (groove markings or dents) |
| 2 | Small cuts and/or ripples in cover |
| 3 | Moderate amount of material lifted from ball surface but still attached to ball |
| 4 | Material removed or barely attached |

The balls that were tested were primed and top coated.

The addition of nylon caused a slight reduction in scuff resistance in Examples 45–48 and 49–52. However, Examples 45 and 49–51 were found to have a scuff resistance that was better than a number of commercially available "soft" golf balls, which typically have a scuff resistance of about 1.0. The "best balls" in this set of Examples were those of Examples 50–51 because they had a soft feel (i.e. low Shore D and relatively high spin) in conjunction with good scuff resistance.

TABLE 15

| EX | % 9320 | % 7520 | % ATX | % DS3076 | % C8351 | MOLD TEMP | MI | SIZE | WT |
|---|---|---|---|---|---|---|---|---|---|
| 45 | 100 | | | | 0 | | 3.7 | 1.6790 | 45.35 |
| 46 | 90 | | | | 10 | | 2.3 | 1.6790 | 45.55 |
| 47 | 80 | | | | 20 | | 1.4 | 1.680 | 45.58 |
| 48 | 70 | | | | 30 | | 0.6 | 1.6790 | 45.68 |
| 49 | | 100 | | | 0 | | 6.7 | 1.680 | 45.52 |
| 50 | | 90 | | | 10 | | 5.1 | 1.681 | 45.63 |
| 51 | | 80 | | | 20 | | 3.6 | 1.681 | 45.67 |
| 52 | | 70 | | | 30 | | 2.6 | 1.681 | 45.77 |
| 53 | | | 100 | | 0 | | 3.1 | 1.679 | 45.37 |
| 54 | | | 90 | | 10 | | 1.5 | 1.679 | 45.44 |
| 55 | | | 80 | | 20 | | 1.2 | 1.680 | 45.60 |
| 56 | | | 70 | | 30 | | 0.8 | 1.680 | 45.65 |
| 57 | | | | 100 | 0 | | | | |
| 58 | | | | 90 | 10 | | | | |
| 59 | | | | 80 | 20 | | | | |

| EX | COMP | COR | HARD[1] | SPIN | DIST D[2] | DIST I[3] | CC[4] | SCUFF[5] | DUR[6] |
|---|---|---|---|---|---|---|---|---|---|
| 45 | 80 | 781 | 71 | 10550 | 248 | 173 | NF | 0.5 | NF |
| 46 | 81 | 781 | 74 | 10299 | 247 | 175 | NF | 1.5 | NF |
| 47 | 79 | 782 | 75 | 10086 | 248 | 175 | NF | 3.0 | NF |
| 48 | 78 | 782 | 80 | 9549 | 248 | 177 | NF | 2.0 | NF |
| 49 | 80 | 781 | 69 | 10622 | 242 | 172 | NF | 0.5 | NF |
| 50 | 80 | 781 | 70 | 10578 | 247 | 173 | NF | 1.0 | NF |
| 51 | 80 | 779 | 74 | 10468 | 248 | 174 | NF | 1.0 | NF |
| 52 | 78 | 780 | 80 | 10245 | 248 | 175 | 1e3[7] | 1.5 | NF |
| 53 | 80 | 782 | 74 | 10405 | 245 | 176 | 1e3[7] | 1.5 | NF |
| 54 | 79 | 783 | 76 | 10318 | 247 | 177 | NF | 3.0 | NF |
| 55 | 79 | 783 | 80 | 10147 | 250 | 176 | NF | 4.0 | NF |
| 56 | 78 | 783 | 84 | 9559 | 249 | 178 | NF | 4.5 | NF |
| 57 | | | | | | | | | |
| 58 | | | | | | | | | |
| 59 | | | | | | | | | |

[1] Shore C hardness
[2] yards, with driver
[3] yards, with 9-iron
[4] cold crack
[5] scuff resistance
[6] NF = 12/12 balls survived 20 blows in COR machine at 150–160 ft/sec.
[7] one break at third blow (most possibly due to molding)

Examples 45, 49, 53 and 57 were controls. As indicated by the results on Table 15, the golf balls of Examples 46–48, 50–51 and 54–56 possessed good cold crack resistance. Example 52 was believed to fail because of poor/inadequate molding. The formations of Examples 57–59 could not be molded due to difficulties during the extrusion process.

Examples 60–68

Use of Blends of Lithium Ionomer and Nylon in Golf Ball Covers

CAPRON 8202 and CAPRON 8351 were blended with various ionomers. In some of the Examples, all of the CAPRON and ionomers were pre-dried and co-extruded. In other Examples, the CAPRON was predried and preextruded with one ionomer and subsequently dry blended with another ionomer. A single screw extruder was used. The results are shown on Table 16.

As indicated by the results on Table 16, blends of nylon with lithium ionomers resulted in good durability. Example 63 shows a golf ball with particularly high durability. Core type A had a Riehle compression in the range of 68–76 and a COR in the range of 0.795–0.805. Core type B had a Riehle compression in the range of 54–62 and a COR in the range of 0.789–0.797.

TABLE 16

| | Pre-dried and Co-extruded | | | | | | Dry Blended | | | | | | | |
|---|---|---|---|---|---|---|---|---|---|---|---|---|---|---|
| EX | % 996 Li | % 996 Na | % 7010 | % BX1 | % 8351 | % 8202 | % 7010 | % 996 Li | COMP | COR | CORE TYPE | 100[1] blows | 200[2] blows | 300[3] blows | DUR[4] |
| 60 | 50 | | 33.3 | | | 16.7 | | | 59 | 826 | A | 12 | 7 | 3 | 257 |
| 61 | 50 | | | | | 16.7 | 33.3 | | 58 | 826 | A | 12 | 10 | 3 | 273 |
| 62 | | | 33.3 | | | 16.7 | | 50 | 59 | 826 | A | 12 | 11 | 5 | 261 |
| 63 | 50 | | 33.3 | | 16.7 | | | | 59 | 824 | A | 12 | 12 | 8 | >300 |
| 64 | | | | 100 | | | | | 60 | 822 | A | 12 | 12 | 11 | >300 |
| 65 | 50 | | 33.3 | | 16.7 | | | | 49 | 810 | B | 12 | 11 | 10 | >300 |
| 66 | | | | 100 | | | | | 50 | 806 | B | 12 | 12 | 11 | >300 |
| 67 | | 50 | | | | 16.7 | 33.3 | | 57 | 825 | A | 12 | 8 | 6 | 258 |
| 68 | | 50 | 33.3 | | 16.7 | | | | 59 | 824 | A | 12 | 11 | 3 | 245 |

[1]Number of balls out of 12 which survived 100 blows
[2]Number of balls out of 12 which survived 200 blows
[3]Number of balls out of 12 which survived 300 blows
[4]Durability - average number of hits to failure Examples 69–96

Use of Small Quantities of Nylon in Ionomeric Golf Ball Covers

A number of blends were made using up to 30 wt % CAPRON 8351 or 10 wt % CAPRON 8202. The cores were of the same formulation as those of Examples 15–28. A twin screw extruder was used for blending. The results are shown on Table 17.

As shown on Table 17, all of the samples exhibited good durability and had good COR.

TABLE 17 part 1

| Ex. # | % Ionomer | % 8351 | % 8202 | COMP | COR | Shore D | Cold Crack | 100[1] blows | 200[2] blows | 300[3] blows | MI |
|---|---|---|---|---|---|---|---|---|---|---|---|
| | | | | Ionomer Resin is a dryblend of 8000/7010 75/25 | | | | | | | |
| 69 | 100 | 0 | | 68 | 800 | 70 | nb | 12 | 12 | 7 | 5.3 |
| 70 | 90 | 10 | | 66 | 801 | 71 | nb | 12 | 12 | 4 | 3.1 |
| 71 | 80 | 20 | | 66 | 801 | 72 | nb | 12 | 12 | 1 | 2.4 |
| 72 | 70 | 30 | | 65 | 800 | 72 | nb | 12 | 8 | 0 | 1.5 |
| 73 | 90 | | 10 | 65 | 802 | 73 | nb | 12 | 12 | 2 | 3.1 |
| | | | | Ionomer resin is a dryblend of 8000/7010 50/50 | | | | | | | |
| 74 | 100 | 0 | | 66 | 803 | 71 | nb | 12 | 12 | 4 | 6.2 |
| 75 | 90 | 10 | | 65 | 803 | 72 | nb | 12 | 12 | 11 | 5 |
| 76 | 80 | 20 | | 64 | 803 | 74 | nb | 12 | 12 | 2 | 3.9 |
| 77 | 70 | 30 | | 65 | 801 | 74 | nb | 12 | 12 | 1 | 2.1 |
| 78 | 90 | | 10 | 66 | 803 | 73 | nb | 12 | 11 | 4 | 5.1 |
| | | | | Ionomer resin is a dryblend of 1006/1007 50/50 | | | | | | | |
| 79 | 100 | 0 | | 68 | 802 | 71 | nb | 12 | 12 | 4 | 6.7 |
| 80 | 90 | 10 | | 67 | 800 | 71 | nb | 12 | 12 | 3 | 5.2 |
| 81 | 80 | 20 | | 66 | 801 | 73 | nb | 12 | 12 | 4 | 3.5 |
| 82 | 70 | 30 | | 65 | 798 | 74 | nb | 12 | 11 | 1 | 2 |
| 83 | 90 | | 10 | 67 | 802 | 75 | nb | 12 | 12 | 7 | 5.2 |

TABLE 17-continued

Ionomer Resin is a dryblend of 1002/1003 50/50

| Ex. # | % Ionomer | % 8351 | % 8202 | Reihle | COR | Shore D | Cold Crack | 100[1] blows | 200[2] blows | 300[3] blows | MI |
|---|---|---|---|---|---|---|---|---|---|---|---|
| 84 | 100 | 0 | | 65 | 805 | 71 | nb | 12 | 12 | 2 | 11.2 |
| 85 | 90 | 10 | | 65 | 805 | 72 | nb | 12 | 11 | 3 | 7.4 |
| 86 | 80 | 20 | | 64 | 804 | 73 | nb | 12 | 10 | 0 | 4.6 |
| 87 | 70 | 30 | | 67 | 810 | 75 | 1 @ 5th blow | 12 | 4 | 0 | 2.8 |
| 88 | 90 | | 10 | 66 | 815 | 75 | nb | 12 | 12 | 0 | 5 |

| Ex. # | % Ionomer | % 8351 | Reihle | COR | Shore D | Cold Crack | 100[1] blows | 200[2] blows | 300[3] blows | MI |
|---|---|---|---|---|---|---|---|---|---|---|
| | | | Ionomer resin is a dryblend of AD8195/AD8444 50/50 | | | | | | | |
| 89 | 100 | 0 | 66 | 818 | 72 | nb | 12 | 12 | 0 | 13.8 |
| 90 | 90 | 10 | 65 | 816 | 73 | nb | 12 | 12 | 1 | 10 |
| 91 | 80 | 20 | 65 | 815 | 74 | nb | 12 | 9 | 1 | 7.2 |
| 92 | 70 | 30 | 64 | 813 | 75 | nb | 12 | 11 | 0 | 8.1 |
| | | | Ionomer resin is a dryblend of AD8195/AD8181 50/50 | | | | | | | |
| 93 | 100 | 0 | 66 | 815 | 73 | nb | 12 | 12 | 0 | 6.3 |
| 94 | 490 | 10 | 67 | 817 | 74 | nb | 12 | 9 | 0 | 4.3 |
| 95 | 80 | 20 | 66 | 814 | 74 | nb | 12 | 7 | 0 | 4.3 |
| 96 | 70 | 30 | 64 | 812 | 75 | nb | 12 | 4 | 0 | 2.3 |

IOTEK 8000 15% AA Na Precursor 37 MI
IOTEK 7010 15% AA Zn Precursor 37 MI
IOTEK 1006 15% AA Na Precursor 20 MI
IOTEK 1007 15% AA Zn Precursor 20 MI
IOTEK 1002 18% AA Na Precursor 28 MI
IOTEK 1003 18% AA Zn Precursor 28 MI
AD 8195 Zn
AD 8444 Na
AD 8181 Li
[1]Number of balls out of 12 which survived 100 blows
[2]Number of balls out of 12 which survived 200 blows
[3]Number of balls out of 12 which survived 300 blows

Examples 97–143

Tensile Data for Ionomers and Nylon-Ionomer Blends

Tensile data was collected for a number of blends of ionomer and nylon. The results are shown on Table 18. The addition of nylon generally increased tensile modulus and energy to break.

TABLE 18

Tensile Data

| Ex. | Ionomer | Nylon Type | % Nylon | Break Stress PSI | % Strain @ Break | Energy to Break In-Lb | Yield Stress PSI | % Strain @ Yield | Modulus[1] PSI |
|---|---|---|---|---|---|---|---|---|---|
| 97 | 8000/7010 (75/25) | — | 0 | 3666 | 211.3 | 58.8 | 3203 | 20.7 | 26825 |
| 98 | | 8351 | 10 | 3834 | 224.3 | 65.9 | 3314 | 21.4 | 27723 |
| 99 | | 8351 | 20 | 3985 | 217.8 | 67 | 3483 | 22.1 | 28777 |
| 100 | " | 8351 | 30 | 4158 | 220 | 70.8 | 3659 | 24.9 | 30363 |
| 101 | " | 8202 | 10 | 3751 | 211.8 | 62 | 3412 | 21.6 | 27254 |
| 102 | 8000/7010 (50/50) | — | 0 | 3496 | 232.5 | 62 | 3151 | 20.1 | 25930 |
| 103 | " | 8351 | 10 | 3635 | 241.6 | 67.3 | 3196 | 20.1 | 26196 |
| 104 | " | 8351 | 20 | 3869 | 265.1 | 76 | 3193 | 20.2 | 26920 |
| 105 | " | 8351 | 30 | 4075 | 257.5 | 77.8 | 3355 | 21.8 | 26928 |
| 106 | " | 8202 | 10 | 3684 | 248.2 | 69.1 | 3179 | 20.9 | 25584 |
| 107 | 1006/1007 (50/50) | — | 0 | 3551 | 239.6 | 66.1 | 3162 | 19.9 | 26335 |
| 108 | " | 8351 | 10 | 3677 | 252.8 | 71.4 | 3125 | 20.4 | 26070 |
| 109 | " | 8351 | 20 | 3995 | 254.5 | 76.2 | 3320 | 20.7 | 27938 |
| 110 | " | 8351 | 30 | 4056 | 246.1 | 75.7 | 3389 | 22 | 29071 |
| 111 | " | 8202 | 10 | 3556 | 234.8 | 65.7 | 3207 | 19.8 | 27561 |
| 112 | 1002/1003 (50/50) | — | 0 | 3759 | 251.8 | 72.5 | 3586 | 18.1 | 30593 |
| 113 | " | 8351 | 10 | 4007 | 276.4 | 81.5 | 3530 | 18.4 | 30491 |
| 114 | " | 8351 | 20 | 4107 | 277.4 | 84 | 3551 | 18.8 | 30589 |
| 115 | " | 8351 | 30 | 4305 | 277.3 | 87.7 | 3683 | 18.1 | 30671 |

TABLE 18-continued part 2

| Ex. # | Ionomer | Nylon | % Nylon | Break Stress PSI | % Strain @ Break | Energy to Break In-Lb | Yield Stress PSI | % Strain @ Yield | Modulus[1] PSI |
|---|---|---|---|---|---|---|---|---|---|
| 116 | 1002/1003 (50/50) | 8202 | 10 | 4481 | 317.2 | 99.8 | 3675 | 17.8 | 32585 |
| 117 | — | 8351 | 100 | 8927 | 478.8 | 255.1 | 5085 | 25.8 | 56670 |
| 118 | | 8351 | 100 | 8312 | 500.4 | 247.2 | 4785 | 27.5 | 42281 |
| 119 | BX1 | 8351 | 40 | 5323 | 293 | 106.2 | 3606 | 20.6 | 30198 |
| 120 | BX1 | 8351 | 20 | 4584 | 265 | 81.8 | 3293 | 19.5 | 28032 |
| 121 | BX1 | | 0 | 3907 | 216.9 | 62.8 | 3305 | 21.6 | 26094 |
| 122 | | 8202 | 100 | 8434 | 422.4 | 248 | 7064 | 19.8 | 63744 |
| 123 | BX1 | 8202 | 80 | 9223 | 518.9 | 288.8 | 5973 | 17.8 | 58195 |
| 124 | BX1 | 8202 | 60 | 7920 | 484 | 238.3 | 5510 | 18.9 | 58424 |
| 125 | BX1 | 8202 | 40 | 6072 | 397.6 | 158.5 | 4771 | 18.1 | 45577 |
| 126 | BX1 | 8202 | 20 | 4538 | 281.4 | 96.4 | 4090 | 20.7 | 35404 |
| 127 | BX1 | | 0 | 3907 | 216.9 | 62.8 | 3305 | 21.6 | 26094 |
| 128 | BX2 | | 0 | 3489 | 217.2 | 61.8 | 3603 | 19.2 | 29755 |
| 129 | BX2 | 8351 | 20 | 3732 | 245.8 | 71.3 | 3540 | 19.5 | 29814 |
| 130 | BX2 | 8351 | 40 | 5465 | 352.6 | 125.2 | 3834 | 20.7 | 32862 |
| 131 | BX2 | 8351 | 60 | 7449 | 459.7 | 212 | 4408 | 34.4 | 37181 |
| 132 | BX2 | | 0 | 3489 | 217.2 | 61.8 | 3603 | 19.2 | 29755 |
| 133 | BX2 | 8202 | 20 | 4760 | 314.6 | 111.7 | 4462 | 18.3 | 37510 |
| 134 | BX2 | 8202 | 40 | 6484 | 422.4 | 174.4 | 4971 | 18.4 | 44209 |

| Ex. # | Ionomer | Nylon Type | % Nylon | Break Stress PSI | % Strain @ Break | Energy to Break In-Lb | Yield Stress PSI | % Strain @ Yield | Modulus[1] PSI |
|---|---|---|---|---|---|---|---|---|---|
| 135 | BX2 | 8202 | 60 | 7202 | 456.6 | 214.4 | 5288 | 21.3 | 49705 |
| 136 | BX3 | | 0 | 3647 | 184.2 | 55.3 | 3866 | 19.5 | 31580 |
| 137 | BX3 | 8351 | 20 | 4010 | 231.7 | 72.2 | 3864 | 19.6 | 32011 |
| 138 | BX3 | 8351 | 40 | 5342 | 327.2 | 118.2 | 4058 | 22.5 | 32499 |
| 139 | BX3 | 8351 | 60 | 7266 | 454.5 | 211.2 | 4695 | 27.8 | 43427 |
| 140 | BX3 | | 0 | 3647 | 184.2 | 55.3 | 3866 | 19.5 | 31580 |
| 141 | BX3 | 8202 | 20 | 4820 | 323.8 | 105.5 | 3768 | 18.2 | 32422 |
| 142 | BX3 | 8202 | 40 | 6341 | 448.2 | 177.2 | 4236 | 17.4 | 40094 |
| 143 | BX3 | 8202 | 60 | 7910 | 488.9 | 232.7 | 5154 | 20.1 | 50535 |

[1]tensile modulus

In any of the compositions employed in the invention, additional materials may be added to these compositions employed to provide desired properties. These materials include, for example, dyes such as Ultramarine sold by Witaker, Clark and Daniels of South Plainfield, N.J., titanium dioxide, UV absorbers and stabilizers. The compositions also may include softening agents such as plasticizers and reinforcing materials such as glass fibers and inorganic fillers. Antioxidants also may be included in the compositions of the invention, conventionally in amounts of about 1% by weight. Useful antioxidants include 4,4'-di (1,1,3,3-tetramethylbutyl) diphenylamine sold under the trade designation "Octamine Antioxidant" by Naugatuck Division of US Rubber. Also useful is the hydroperoxide decomposer antidegradant tetrakis (2,4-ditertbutylphenyl)-4,4'-biphenylenediphosphonite sold under the trade designation "Sandostab P-EPQ" by Sandoz Colors & Chemicals Co.

The compositions employed in the invention may be prepared by any conventional procedure that provides a substantially uniform admixture of the components. Preferably drying and melt blending procedures and equipment are used. For example, in preparation of compositions which employ nylon materials such as RP with one or more terpolymers and/or terpolymer ionomers, the terpolymer and/or terpolymer ionomer can be dry mixed with RP, typically at room temperature, and the resulting mixture melt blended in any conventional type blending equipment heated to about 200–250° C. The nylon material and the copolymer, terpolymer, terpolymer ionomer, and/or copolymer ionomer preferably are dried (either individually or together) before melt blending. Drying is done in desiccated air at a temperature and for a time suitable to reduce the moisture content to a point which it will not have any adverse effect on the subsequent use of the compositions or the properties of the resulting product. If additives such as those identified above have not previously been added to either the nylon material, the copolymer or copolymer ionomer during processing of those individual components, i.e., before they are admixed with each other, the additives may be added during melt blending of those components. The uniform admixture resulting from the melt blending procedure then may be commuted by chopping, pelletizing or grinding into granules, pellets, chips, flakes or powders suitable for subsequent use, e.g. injection molding to provide a golf ball.

The invention has been described with reference to the preferred embodiments. Modification and alterations will occur to others upon reading and understanding the preceding detailed description. It is intended that the invention be construed as including all such alterations and modifications insofar as they come within the scope of the claims and the equivalents thereof.

What is claimed is:

1. A golf ball having a cover layer wherein said cover layer is formed from a resin composition comprising a combination of three components wherein said components comprise a polyamide component, an ionomeric component, and an ester component, the content of the polyamide component being at least 23 wt. % of the resin composition, the golf ball having a coefficient of restitution of at least 0.750.

2. A golf ball according to claim 1, wherein the polyamide component includes at least one member selected from the group consisting of a polyamide homopolymer and a polyamide copolymer.

3. A golf ball according to claim 1, wherein at least a portion of the polyamide component and the ionomeric component are part of the same copolymer.

4. A golf ball according to claim 1, wherein the combination of the polyamide component and ionomeric component is a reaction product.

5. A golf ball according to claim 1, wherein the polyamide component is present in a mixture with the ionomeric component.

6. A golf ball according to claim 1, wherein the golf ball has a Durability Rating of at least 2.

7. A golf ball according to claim 1, wherein the combination has 23–85 weight % polyamide component, and 15–77 weight % ionomeric component.

8. A golf ball according to claim 1, wherein the polyamide in the polyamide component includes at least one member selected from the group consisting of polyepsiloncaprolactam and polyhexamethyleneadipamide.

9. A golf ball according to claim 1, wherein the ester component is an olefin ester copolymer component.

10. A golf ball according to claim 1, wherein at least a portion of each of the ester component, polyamide component and ionomeric component are part of the same copolymer.

11. A golf ball according to claim 9, wherein the combination of the polyamide component, ionomer component and olefin ester copolymer component comprises a reaction product.

12. A golf ball according to claim 10, wherein the composition further comprises a carboxylic acid-containing copolymer which includes at least one member selected from the group consisting of ionomeric copolymers and non-ionomeric copolymers and which is mixed with the reaction product.

13. A golf ball according to claim 1, wherein the ionomeric component includes an alkyl acrylate.

14. A golf ball according to claim 1, wherein the polyamide component is a polyamide homopolymer and the ionomeric component is an ionomeric copolymer with two types of monomers.

15. A golf ball according to claim 1, wherein the polyamide component is a polyamide homopolymer and the ionomeric component is an ionomeric terpolymer.

16. A method of making a golf ball, comprising the steps of:
    obtaining a golf ball core, and
    forming a cover layer over the core, the cover layer having a three component resin composition comprising a combination of a polyamide component, an ionomeric component, and an ester component, the content of the polyamide component being at least 23 wt. % of the resin composition, the golf ball having a coefficient of restitution of at least 0.750.

17. A golf ball according to claim 16, wherein the ester component is an olefin ester copolymer component.

18. A golf ball according to claim 17, wherein the combination of the polyamide component, ionomeric component and olefin ester copolymer component comprises a reaction product.

19. A golf ball according to claim 16, wherein at least a portion of each of the ester component, polyamide component, and ionomeric component are part of the same copolymer.

20. A golf ball having a cover layer with a three component composition comprising a graft copolymer of (1) at least one of a polyamide homopolymer and a polyamide copolymer, (2) a first ionomeric copolymer which is formed from an α-olefin and a carboxylic acid, and (3) an ester component, the cover layer having a Shore D hardness of at least 30, the golf ball having a Durability Rating of at least 2.

21. A golf ball according to claim 20, wherein the cover layer further includes a second ionomeric copolymer which is blended with the graft copolymer.

22. A golf ball according to claim 20, wherein the cover layer has a Shore D hardness of 30–60.

23. A golf ball according to claim 20, wherein the cover layer has a Shore D hardness of at least 65.

24. A golf ball according to claim 20, wherein the polyamide homopolymer includes at least one member selected from the group consisting of polyepsiloncaprolactam and polyhexamethyleneadipamide.

25. A golf ball according to claim 20, wherein the ester component is an olefin ester copolymer component.

26. A golf ball having a cover layer with a three component composition comprising a nylon backbone with an ionomer grafted thereto and an ester component, the golf ball having a coefficient of restitution of at least 0.750.

27. A golf ball according to claim 26, wherein the cover layer has a Shore D hardness of 30–60.

28. A golf ball according to claim 26, wherein the cover layer has a Shore D hardness of at least 65.

29. A golf ball according to claim 26, wherein the ester component is an olefin ester copolymer component.

30. A golf ball having a cover layer with a three component resin composition comprising at least 10 wt. % of a graft copolymer of polyepsiloncaprolactam and ionomer, further wherein the cover composition includes an ester component, the graft copolymer having a yield tensile strength of about 54 MPA (ASTM D-638), a flexural modulus of about 1585 MPA (ASTM D-790), and a drop weight impact at −40° F. of about 200J (ASTM D-3029).

31. A golf ball according to claim 30, wherein, the resin composition includes an ionomeric terpolymer blended with the graft copolymer.

32. A golf ball according to claim 31, wherein the resin composition comprises at least 80 wt % of the graft copolymer.

33. A golf ball according to claim 30 wherein the ester component is an olefin ester copolymer component.

* * * * *

UNITED STATES PATENT AND TRADEMARK OFFICE
CERTIFICATE OF CORRECTION

PATENT NO.    : 6,380,310 B2
DATED         : April 30, 2002
INVENTOR(S)   : Michelle A. Bellinger and Michael J. Sullivan It is certified that error appears in the above-identified patent and that said Letters Patent is hereby corrected as shown below:

<u>Title page,</u>
Below Item [76], insert the following:
-- [73]  Assignee:  Spalding Sports Worldwide, Inc.
                   425 Meadow Street, P.O. Box 901
                   Chicopee, Massachusetts 01021-0901

Signed and Sealed this

Fifth Day of November, 2002

Attest:

Attesting Officer

JAMES E. ROGAN
*Director of the United States Patent and Trademark Office*